United States Patent
Fischer et al.

(10) Patent No.: US 10,670,502 B2
(45) Date of Patent: Jun. 2, 2020

(54) HIGH-G SHOCK TESTING MACHINE

(71) Applicant: Omnitek Partners LLC, Ronkonkoma, NY (US)

(72) Inventors: Jacques Fischer, Sound Beach, NY (US); Jahangir S Rastegar, Stony Brook, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 0 days.

(21) Appl. No.: 16/236,407

(22) Filed: Dec. 29, 2018

(65) Prior Publication Data

US 2020/0025660 A1 Jan. 23, 2020

Related U.S. Application Data

(63) Continuation-in-part of application No. 15/058,057, filed on Mar. 1, 2016, now Pat. No. 10,190,937.

(60) Provisional application No. 62/129,791, filed on Mar. 7, 2015.

(51) Int. Cl.
*G01N 3/307* (2006.01)
*G01M 7/08* (2006.01)
*F16D 65/18* (2006.01)
*G01M 99/00* (2011.01)

(52) U.S. Cl.
CPC ............ *G01N 3/307* (2013.01); *F16D 65/18* (2013.01); *G01M 7/08* (2013.01); *G01M 99/004* (2013.01)

(58) Field of Classification Search
CPC ...... G01M 7/08; G01M 99/004; G01N 3/307; G01N 3/31; F16D 65/18
See application file for complete search history.

(56) References Cited

U.S. PATENT DOCUMENTS

| | | | | |
|---|---|---|---|---|
| 3,430,481 A * | 3/1969 | Shinbaum | ............... | G01M 7/08 73/12.04 |
| 3,757,562 A * | 9/1973 | Goldberg | ................ | G01M 7/08 73/12.04 |
| 5,872,321 A * | 2/1999 | Yannaccone | ............ | G01M 7/08 73/12.04 |
| 5,929,348 A * | 7/1999 | Stein | ........................ | G01M 7/08 73/12.07 |
| 6,213,564 B1 * | 4/2001 | Face, Jr. | ................. | B60T 7/042 188/158 |
| 6,609,409 B1 * | 8/2003 | Bock | ....................... | G01M 7/08 73/12.01 |

(Continued)

*Primary Examiner* — Natalie Huls

(57) ABSTRACT

A brake for use with a shock testing machine, the brake including: a brake material for generating a frictional force to stop a test platform when the brake material is urged against an opposed braking surface; links for rotatably connecting the brake material to the test platform; a biasing spring to bias the brake material towards the braking surface; a restraint mechanism for restraining the braking material, against a biasing force of the biasing spring, in a retracted position where the braking material is separated from the braking surface; and a release mechanism for releasing the restraint of the release mechanism to bias the brake material against the braking surface; wherein the links are configured such that relative movement between the brake material and braking surface while the brake material and braking surface are engaged causes a frictional force between the brake material and braking material to increase.

11 Claims, 15 Drawing Sheets

(56) References Cited

U.S. PATENT DOCUMENTS

| | | | | |
|---|---|---|---|---|
| 6,675,631 B1 * | 1/2004 | Steffan | ............... | G01M 17/0078 |
| | | | | 73/12.04 |
| 2005/0188744 A1 * | 9/2005 | Camio | ..................... | G01M 7/08 |
| | | | | 73/12.01 |
| 2007/0251295 A1 * | 11/2007 | Rieser | ............... | G01M 17/0078 |
| | | | | 73/12.07 |
| 2013/0139622 A1 * | 6/2013 | Park | ..................... | F16H 25/2454 |
| | | | | 74/89.32 |
| 2013/0174639 A1 * | 7/2013 | Earthman | ................. | A61B 9/00 |
| | | | | 73/12.01 |
| 2014/0144207 A1 * | 5/2014 | Weber | ............... | G01M 17/0078 |
| | | | | 73/12.07 |
| 2014/0283579 A1 * | 9/2014 | Covic | ............... | G01M 17/0078 |
| | | | | 73/12.01 |
| 2015/0226635 A1 * | 8/2015 | Knott | ...................... | G01M 7/08 |
| | | | | 73/12.04 |
| 2016/0161362 A1 * | 6/2016 | Rastegar | ................. | G01M 7/08 |
| | | | | 73/12.07 |
| 2018/0067030 A1 * | 3/2018 | Rastegar | ................. | G01N 3/307 |

\* cited by examiner

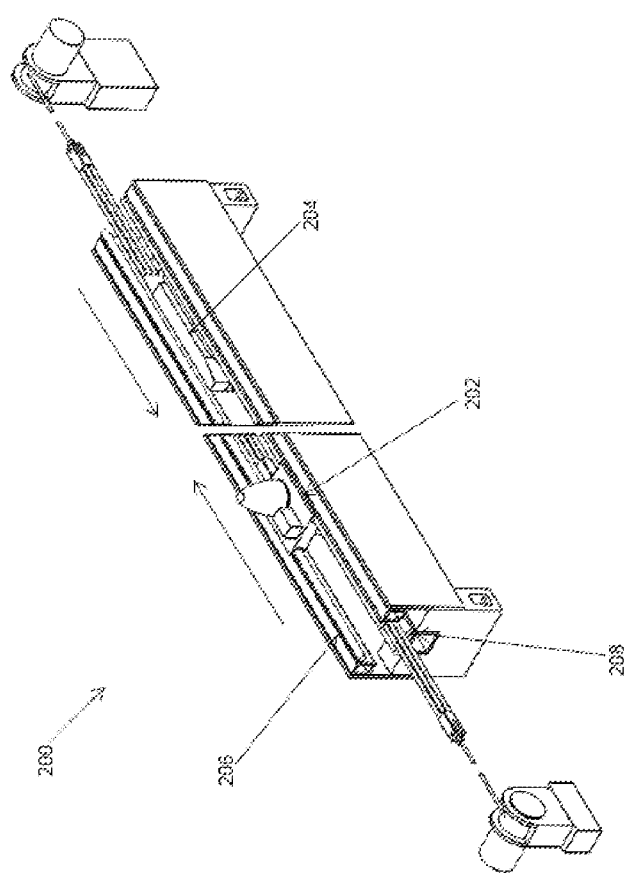

HIGH-G SHOCK TESTING MACHINE

CROSS REFERENCE TO RELATED APPLICATIONS

This application is a continuation-in-part application of U.S. patent application Ser. No. 15/058,057 filed on Mar. 1, 2016, which claims benefit to U.S. Provisional Application No. 62/129,791 filed on Mar. 7, 2015, the contents of which is incorporated herein by reference.

BACKGROUND

1. Field

The present invention relates generally to high-G shock testing machines, and more particularly to low-cost, reusable, "pseudo-static" testing machines and methods capable of imposing high acceleration and deceleration (>±10,000 g), opposing loads to a large (10-100+ lbs.) payload that are sustained over long durations (>5 msec). Such machine would provide the means for testing ordnance and commercial products/components under multi-axial loading, which includes both bending and shear moments. This includes the most extreme example of such events, namely "tail slap", where large lateral accelerations are introduced due to the bending and rebound of the product/component in the lateral direction, e.g., in the case of ordnance, perpendicular to the axis of penetration.

2. Prior Art

Gun-fired munitions, mortars and rail-gun munitions are subjected to high-G (setback and set-forward) acceleration during launch and target impact. Similar but more complex combinations of axial as well as lateral and bending shock loadings are experienced by air dropped weapons as they impact the target, particularly when the weapon is rocket assisted to achieve high impact velocities and when the target structure is highly heterogeneous, such as reinforced concrete or soil with large rock content. As a result, all components of the system and the system itself must survive such shock loading events and be qualified to such severe environments.

Developing a controllable test method and predictive capability to apply this environment in testing is critical to the development of fuze, energetic, and other weapon technologies. However, the corresponding change in velocity typically requires ballistic or operational testing. Both testing methods are extremely costly, personnel intensive, and introduce both technical and safety risks.

The vast majority of aircraft and satellite components, whether military or commercial, must be tested under certain shock loading conditions. That is, aircraft components must be shock tested to ensure that their design will survive its intended environment. Consequently, different aircraft components may have widely varying shock testing requirements. Currently, there is no one shock testing apparatus that can shock test aircraft components to accommodate the varying shock testing requirements for aircraft components, if at all. Thus, the industry resorts to building specialized shock testing machines or using computer simulation for shock testing, methods which are expensive and/or inaccurate.

In addition to rigorous vibration profiles, many consumer electronic components must be shock tested to determine how they will perform under certain shock conditions. Electronic components are often shock tested to determine how they will survive under unintended conditions, such as repetitive dropping. Of such consumer electronic components, device casings and circuit boards are often shock tested to determine survivability due abuse while other electronic devices are designed for heavy duty usage, such as in the construction trade and must be shock tested to determine if they are fit for their particular harsh environment. The current shock testing methods for consumer electronic devices have the same shortcomings as those described above with regard to commercial aircraft. Current shock testing machines in the consumer electronics area are either very simple drop testing from heights or pneumatic shock machines, both of which are inaccurate and their repeatability is unreliable.

Automobile components (as well as light and heavy duty truck components) must also undergo rigorous shock testing under normal use as well as components which can fail during a crash. Some automobile components must undergo shock testing to determine how they will perform under normal conditions, such as some structural frame components while other components must undergo shock testing to determine their performance during a crash, such as electronic components, steering wheels, airbags and the like. Like other shock testing machinery currently available in the areas of commercial aircraft and consumer electronics, the shock testing of automobile components are inaccurate, their repeatability is unreliable and they can also be relatively expensive.

SUMMARY

It is therefore an object to develop a low-cost, reusable testing method and accompanying experimental and simulation capabilities that can reproduce acceleration/time profiles representative of weapon target penetration as well as shock loading experienced by aircraft and other commercial products. This includes the experienced acceleration amplitude for a duration, or equivalently the integrated velocity change, in opposing shock-countershock mode, and multiple directions (multi-axial) for a sizable test article.

It is also appreciated that practical test considerations impose additional requirements beyond the required multi-axial acceleration/duration performance. Most tests call for more sensor channels than are recordable in an onboard recording system. In these instances, a nearly-stationary (i.e., "pseudo-static") test article or systems in which the test article undergoes limited and highly controlled resulting displacements that would allow the use of the desired number of sensor channels through direct cable harnesses, onboard recording systems and/or ultra-high speed RF or optical wireless communications. Another benefit of such shock testing systems is that off-board instrumentation is able to collect more channels of data with higher precision and sampling rates. One example of a pseudo-static testing is reverse ballistics where a target is propelled into a stationary and fully instrumented "Unit Under Test" (UUT).

It is also appreciated that it is critical that the shock testing system be scalable so that they would enable testing of both small UUTs and larger test vehicles. In this regard, the shock testing system can test articles ranging from circuit boards for consumer electronics weighing several ounces to ordinances/components weighing several hundred pounds.

In this disclosure, the following two novel classes of shock/tail-slap testing machine concepts are presented:

1. A class of multi-axial shock loading machines for applying short duration high acceleration and deceleration pulses of over ±10,000 g over long periods of time of well over 5 msec. These shock loading machines can apply one or a combination of shock loading pulses to the UUT in the axial and lateral directions to simulate almost any shock loading events, including the "tail slap", where large lateral accelerations are introduced due to the bending and rebound of an ordinance in the lateral direction.

2. A class of high and long duration shock loading machines to simulate penetration shock loading with the capability of simultaneously applying relatively short and/or long duration lateral shock loadings to simulate "tail slap" events where lateral accelerations are introduced due to the bending and rebound of the ordnance in the lateral direction. In these machines, the penetration shock loading is generated by braking forces applied to the test platform over which the ordnance being tested is mounted. Lateral shock loading of the platform generates vibratory motion of the platform to generate the lateral shock loading events. The braking forces as well as shock loading levels may be varied to generate the desired shock loading profiles.

In addition, methods are presented for accurately modelling both the test conditions and the test article.

The development of such shock testing machines having relatively low-cost to construct and operate, being reusable, and that uses "pseudo-static" testing techniques or similar techniques that are capable of imposing high acceleration and deceleration (>±10,000 g), opposing loads to a large (10-100+ lbs.) payload that are sustained over long durations (>5 msec).

The two novel classes of shock/tail-slap testing machine concepts provide "Ordnance Shock/Tail-Slap Replicator" systems that provide the means for testing ordnance under multi-axial loading, which includes both bending and shear moments. This includes the most extreme example of such events, namely "tail slap", where large lateral accelerations are introduced due to the bending and rebound of the weapon in the lateral direction, i.e., perpendicular to the axis of penetration.

Accordingly, a shock testing machine is provided. The shock testing machine comprising: a test platform upon which one or more objects to be tested are mounted; one or more rails upon which the test platform is movable; and a braking station having one or more braking elements operatively engageable with one or more corresponding braking surfaces on the test platform after the test platform has moved a predetermined distance relative to the braking station, wherein the one or more braking elements are movable to vary a gap between the one or more braking elements and the one or more braking surface.

The shock testing machine can further comprise one or more actuators for moving the braking elements. The one or more actuators can comprise one or more piezoelectric actuators.

The one or more braking elements can comprise a beveled region such that a portion of the braking element in the beveled region has a thickness that increases with a direction of travel of the test platform.

A method for shock testing one or more objects is also provided. The method comprising: mounting the one or more objects to a test platform; movably disposing the test platform on one or more rails; moving the test platform a predetermined distance relative to a braking station; varying a braking amount of the braking station by varying a gap between one or more braking elements at the braking station and one or more corresponding braking surfaces at the test platform; and braking the test platform by contacting the one or more braking elements with the corresponding one or more braking surfaces.

Also provided is a shock testing machine comprising: a test platform upon which one or more objects to be tested are mounted; one or more rails upon which the test platform is movable in a longitudinal direction; and a braking station for retarding a relative motion between the test platform and the braking station, wherein the test platform and the braking station include at least one portion interfering with the relative motion of the test platform and the braking station such that relative movement of the test platform and the braking station past the at least one portion produces a shock lateral to the longitudinal direction.

The at least one portion comprises one or more protuberances on the test platform and one or more protuberances on the braking station, wherein the one or more protuberances on the test platform overlap with the one or more protuberances on the braking station in a direction lateral to the longitudinal direction. The shock testing machine can further comprise one or more actuators for varying an amount of the overlap in the direction lateral to the longitudinal direction. The one or more actuators can comprise one or more piezoelectric actuators.

The test platform can be rotatable about a pivot such that the one or more protuberances on the test platform is movable in the direction lateral to the longitudinal direction. The test platform can be biased to resist rotation about the pivot.

The braking station can be stationary relative to the test platform.

The braking station and test platform can be movable relative to each other. The shock testing machine can further comprise one or more second rails upon which the braking station is movable in the longitudinal direction.

Also provided is a method for shock testing one or more objects. The method comprising: mounting the one or more objects to a test platform; movably disposing the test platform on one or more rails; moving the test platform in a longitudinal direction a predetermined distance relative to a braking station; and causing an interference between the test platform and the braking station such that relative movement of the test platform and the braking station past the at least one portion produces a shock in a direction lateral to the longitudinal direction. The method can further comprise varying an amount of the interference in the direction lateral to the longitudinal direction.

Also provided is a shock testing machine comprising: a test platform for holding one or more objects to be shock tested, the test platform having an impact surface; a fixed member having a surface disposed a predetermined distance from a corresponding surface of the test platform, the test platform being movable such that the surface of the test platform can contact the corresponding surface of the fixed member upon an impact to the impact surface; and a flywheel having one or more cams for contacting the impact surface upon rotation of the flywheel such that the impact of each of the one or more cams on the impact surface causes the surface of the test platform to impact the corresponding surface of the fixed member to produce a shock in the one or more objects to be tested. The shock testing machine can further comprise a biasing member for biasing the surface of the test platform away from the corresponding surface of the fixed member.

The impact surface can comprises first and second impact surfaces, the fixed member can comprise first and second surfaces each disposed a predetermined distance from a corresponding first and second surface of the test platform, the test platform being movable such that the first and second surfaces of the test platform can contact the corresponding first and second surfaces of the fixed member upon an impact to the first and second impact surfaces, and the flywheel can comprise first and second flywheels each having one or more cams for contacting a corresponding first and second impact surface upon rotation of the first and second flywheels.

The one or more cams can comprise a plurality of cams equally spaced along a circumference of the flywheel.

The one or more cams can be biased radially outward from the flywheel.

BRIEF DESCRIPTION OF THE DRAWINGS

These and other features, aspects, and advantages of the apparatus of the present invention will become better understood with regard to the following description, appended claims, and accompanying drawings where:

FIG. 5 illustrates a perspective view of another alternative shock testing machine in which the test platform and braking unit are accelerated towards each other.

DETAILED DESCRIPTION

While the present shock-loading devices and methods may have particular utility with regard to testing shock loading of articles for use in ordinances, such shock loading devices and methods also have utility in testing other articles for use in military and commercial aircraft as well as commercial products, such as automobile and consumer electronic components. Thus, without limiting the applicability of such shock-loading devices and methods to articles for use in ordinances, the present disclosure will discuss embodiments with regard to shock loading of articles for use in ordinances by way of example.

A first embodiment of shock and shock/tail-slap testing machines are variations based on the basic design of the shock testing machine described in U.S. application Ser. No. 14/500,921 filed on Sep. 29, 2014, the disclosure of which is incorporated herein by reference. The machines of the first embodiment provide high and relatively long duration axial shock loading, which could be made varying in time, while providing a number of tail-slap producing (lateral) shock loadings of different amplitudes and durations resulting in bending vibratory loading of the testing object.

A second embodiment of shock and shock/tail-slap testing machines are for applying short duration and high acceleration/deceleration pulses, such as of over ±10,000 g over durations of e.g., over 5 msec. These shock loading machine concepts can apply one or a combination of shock loading pulses to the article being tested, such as an ordinance, in axial and lateral directions to simulate almost any shock loading events, including tail slap, where large lateral accelerations/decelerations are introduced due to the bending and rebound in the lateral direction. For purposes of this disclosure, "tail-slap" means a shock loading event in a direction perpendicular to its intended motion, such intended motion being in a direction of penetration with regard to an ordinance. For other articles being testing, the term shock loading event is merely in a direction created by the machine with regard to an orientation of the article being tested in the machine.

The first embodiment of shock and shock/tail-slap testing machines are variations based on the basic design of the Omnitek shock testing machine described in U.S. application Ser. No. 14/500,921 filed on Sep. 29, 2014. The machines of the first embodiment can provide high and relatively long duration axial shock loading, which could be made time varying, while providing a number of tail-slap producing (lateral) shock loadings of different amplitudes and durations that result in bending vibratory loading of the article being tested. The design of the shock loading machine can achieve high-G shock loading, such as up to 3,000 G (and time varying if desired) with a durations of up to 3 msec.

Figure 1:
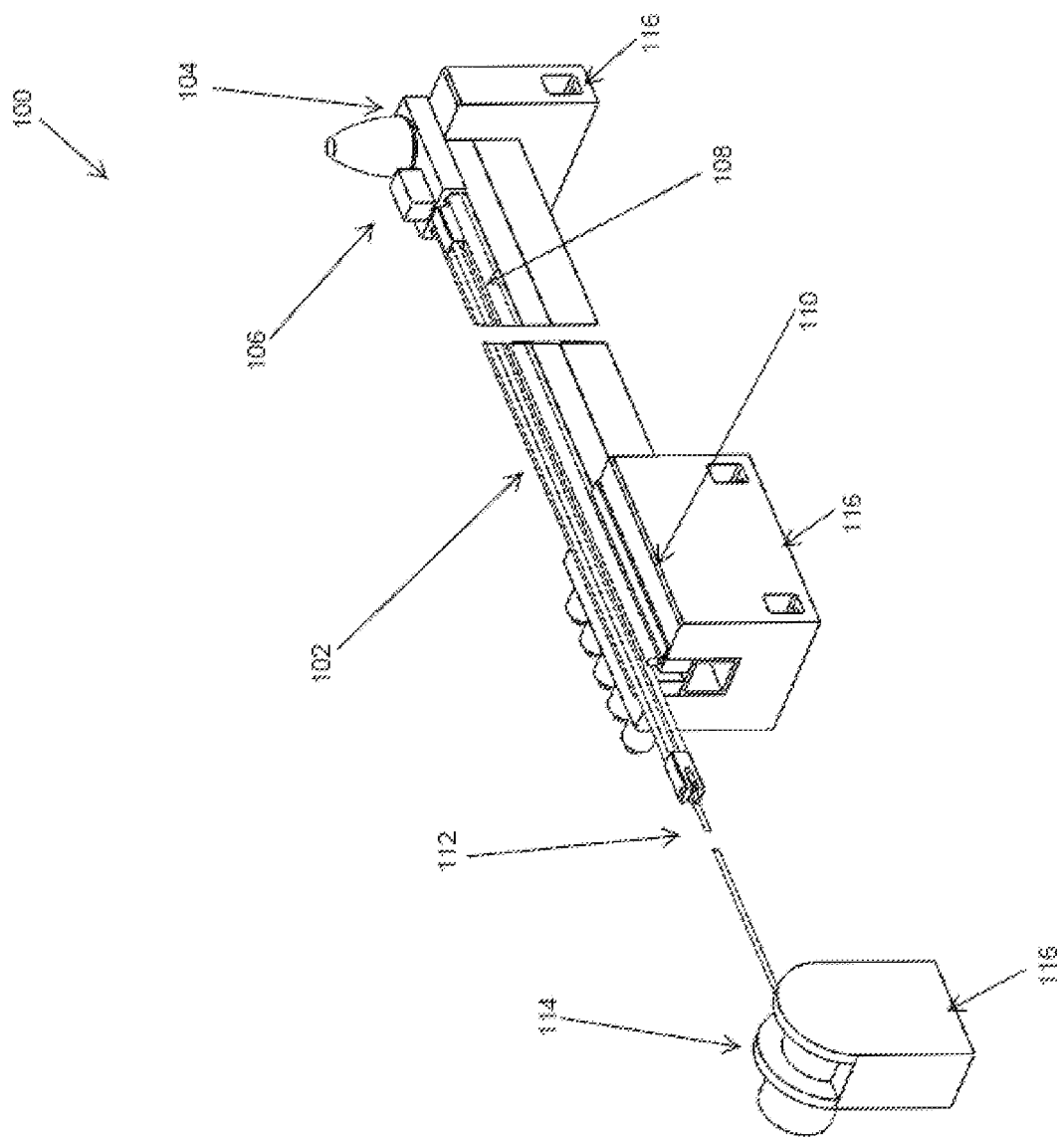
FIG. 1 illustrates a perspective view of a first embodiment of a shock testing machine.

The shock testing machine of the first embodiment is shown in FIG. 1, generally referred to by reference numeral 100. In FIG. 1, the breaks on the left and right of the machine are used to denote a long length of the components being broken. In this design, the machine 100 is laid down horizontally to allow the use of longer test platform travel and the use of longer length bungee cords 102 to provide large accelerating forces to the test platform 104 over the entire range of its travel. The test objects 106 are mounted over the test platform 104 using mounting means specific to the type of object and the testing required. The test platform 104 is accelerated on one or more guide rails 108 towards a braking station 110 having braking elements (described below) by locking the test platform 104 from movement, tensioning the bungee cords 102 with the bungee tensioning cable 112 and winch 114 and then releasing the test platform 102 to allow the tension in the bungee cord(s) 102 to accelerate the test platform 104 towards the braking station 110, similarly to that of the shock testing machine described in U.S. application Ser. No. 14/500,921 and its braking force is similarly adjusted, however, as will be described below, such braking force may be varied during the braking event. The above components may be integrated into another machine or provided with one or more bases 116 for stability.

Figure 2:
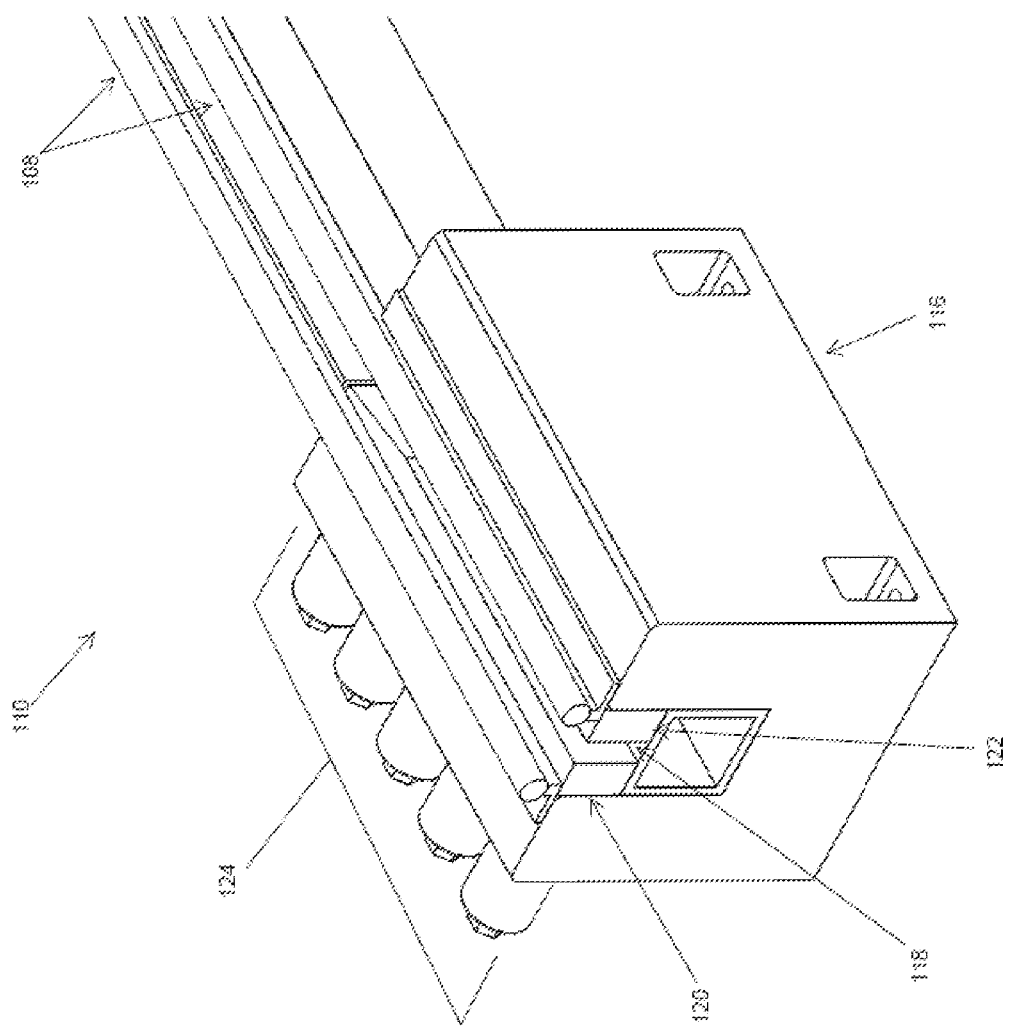
FIG. 2 illustrates a perspective view of the braking station of the shock testing machine of FIG. 1.

A close up view of the braking station 110 of the shock loading machine 100 of FIG. 1 is shown in FIG. 2. In the shock loading machine 100, the braking station 110 is provided with a "brake engagement pathway" 118 with an adjustable gap for braking force adjustment. The brake engagement pathway 118 is provided with a similar "brake force adjustment element" 120 on one side of the brake engagement pathway 118, which in FIG. 2 and for the sake of simplicity is shown to be made of a single rigid piece, but may be constructed with two or more segments that are joined to a single relatively thin, flexible in bending but hard spring steel facing braking pads 122 on the other side of the brake engagement pathway 118. The brake force adjustment element(s) 120 are movable into and out from the brake engagement pathway 118. Brake force adjustment actuators 124, such as large diameter piezoelectric axial actuation elements of around 5-7 cm long may then be used to selectively move the brake force adjustment element(s) to vary the braking forces applied to the corresponding braking surfaces, such as braking pads 126 (see FIG. 3), of the test platform 104, thereby allowing the deceleration rate of the test platform 104 and thereby the test object 106 to be time varied. It will be appreciated by those skilled in the art that by using relatively thin braking pads of the order of 4-5 mm, by varying the gap in the brake engagement pathway 118 a very small amount, such as just 3-4 microns, the braking force can be varied significantly. Therefore the use of axial piezoelectric actuators are capable of allowing the machine 100 to significantly vary the deceleration rate of the test object 106 as it is decelerated to a stop.

Figure 3:
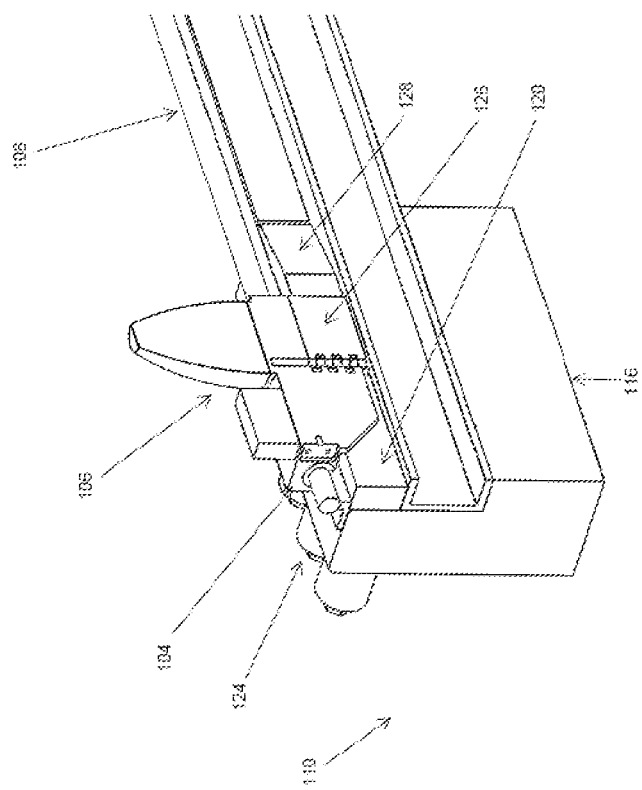
FIG. 3 illustrates a perspective cutaway view of the braking station of FIG. 2 showing engagement with the test platform.

A cutaway view of the braking station 110 showing engagement of the test platform brakes with the surfaces of the brake engagement pathway gap walls is shown in FIG. 3. Half of the braking station is not shown in FIG. 3 so that the braking pads 126 are visible. As can be seen, the brake engagement pathway walls are provided with an initial beveled region 128 to ensure smooth initial engagement with the braking pads 126 (only one side is shown in FIG. 3, another braking pad is on the other side of the test platform 104 not visible in FIG. 3). Although only one pair of braking pads 106 is employed in FIGS. 2 and 3, however, for higher braking force levels corresponding to heavier payloads as well as higher shock loading acceleration levels, multiple pairs of such braking pads 126 may be used to distribute the braking forces over larger braking pad surfaces.

Figure 4:
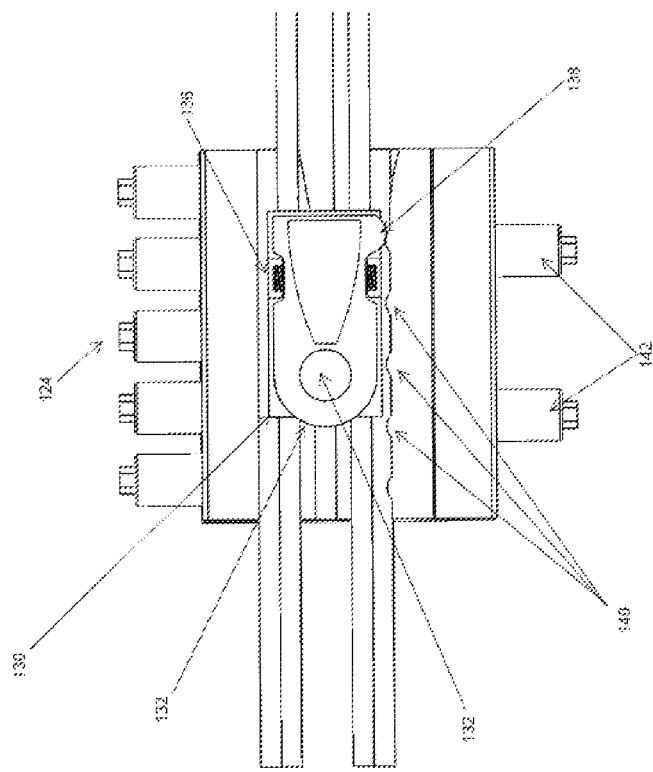
FIG. 4 illustrates a top view of a variation shock testing machine having an alternative test platform and moving carriage.

Referring now to FIG. 4, there is illustrated a variation of the first embodiment of shock testing machine, which the test platform of FIGS. 1-3 is replaced by a "moving carriage" 130 to which a test platform 132 is attached by a rotary joint 134, as shown in FIG. 4. In FIG. 4, features similar to those described with regard to FIGS. 1-3 use the same reference numerals as in FIGS. 1-3. As the moving carriage 130 is accelerated towards the braking station 110 by the pre-tensioned bungees 102, the test platform 132 is held in its nominal orientation relative to the moving carriage shown in FIG. 4 by the indicated "preloaded test platform to moving carriage springs" 136. Then, as the braking pads 126 mounted on the moving carriage 130 engage the walls of the brake engagement pathway 118 as described for the shock loading machine of FIGS. 1-3, a "tail-slap producing protuberance" 138 provided on the test platform 132 will engage "tail-slap producing humps" 140 which are fixed to the structure of the braking station 110, thereby imparting a short duration lateral impulse to the test platform 132, causing it to start to vibrate rotationally about the platform rotary hinge 134. The amplitude of the imparted impulse may be adjusted by the provided tail-slap adjustment actuators 142 that control lateral positioning of the humps. By providing stops to limit the rotary motion of the test platform 132 relative to the moving carriage 130, higher tail-slap producing lateral shock loading may also be produced.

For the axial and axial/tail slap testing machines of FIGS. 1-3 and 4, respectively, the maximum shock loading levels and durations are limited to the maximum achievable velocity of their testing platform, i.e., the velocity at which the braking pads engage the stationary walls of the brake engagement pathway gaps. Another variation of a shock testing machine is shown in FIG. 5, referred to generally by reference numeral 200. In FIG. 5, the breaks on the left, center and right of the machine are used to denote a long length of the components being broken. In the shock testing machine 200 of FIG. 5, the test platform 202 as well as the braking unit 204 are movable towards each other over separate pairs of overlaying rails 206 (corresponding to the test platform 202) and 208 (corresponding to the braking unit). All other components are similar to those discussed above. The test platform 202 and the braking unit 204 are accelerated towards each other as shown by the arrows, thereby allowing them to reach twice the relative velocity as the test platform could reach relative to a stationary braking unit. As a result, the axial shock/tail-slap testing machine can achieve significantly higher shock loading levels, or when desired, higher shock loading duration.

Figure 6:
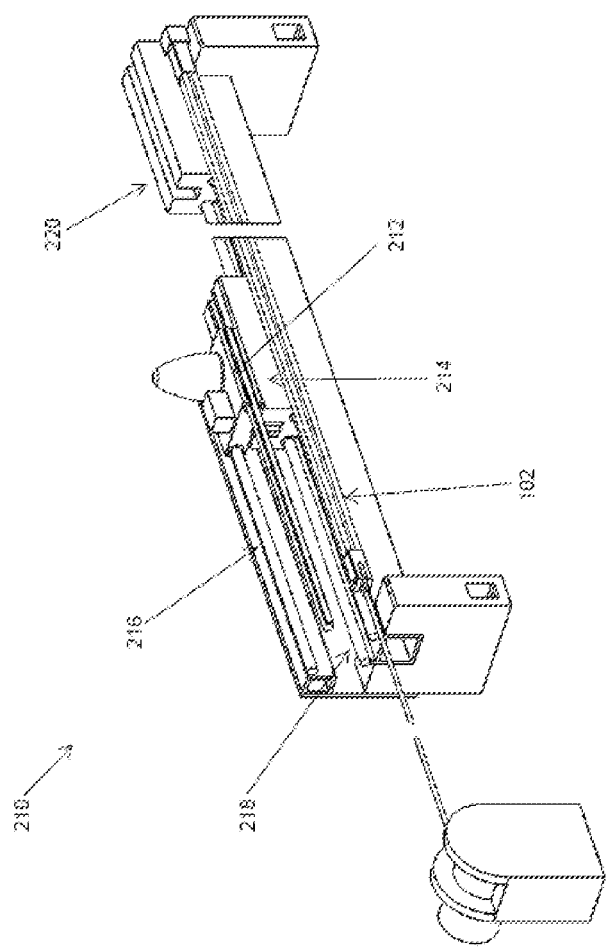
FIG. 6 illustrates a perspective view of another variation of shock testing machine of the first embodiment.

In another alternative design of the axial and axial/tail slap testing machines of FIGS. 1-5, another variation of the first embodiment of shock testing machine is shown in FIG. 6, referred to generally with reference number 210. In FIG. 6, the breaks on the left and right of the machine are used to denote a long length of the components being broken. Furthermore, the guide rails 216 are not shown extended past the test platform 212 for simplicity. In the shock testing machine 210, similar to the shock testing machine 200 of FIG. 5, the test platform 212 and the braking unit 214 are still movable over separate pairs of overlaying rails 216, 218. However, the braking pads of the test platform 212 are initially engaged inside the brake engagement pathway gap of the braking unit 214. In a simple version of this design, the engaging test platform 212 and braking unit 214 are initially stationary. An impact mass 220, which rides over the braking unit rail 218, is accelerated towards the braking unit by the aforementioned bungee cords 102. The impact mass 220 will then impact the braking unit 214, forcing it to begin to travel towards the left as seen in FIG. 6 with a resulting initial velocity which is dependent on the mass of the impact mass 220 and the braking unit 214. The braking unit 214, through the test platform braking pads, will then exert a nearly constant force to the test platform 212 until their relative velocity vanishes. The nearly constant braking force results in a near constant acceleration of the test platform 212 with very sharp rise and fall times, i.e., resulting in a near square wave acceleration profile. This design can also be provided with the earlier described tail-slap mechanism of FIG. 4.

A second embodiment of shock and shock/tail-slap testing machines are intended to apply high peak and short duration acceleration and deceleration pulses, such as over ±10,000 g over long durations, such as well over 5 msec. These shock loading machines can apply one or a combination of shock loading pulses to the test object, such as to an ordnance in the axial and lateral directions to simulate almost any shock loading events, including tail-slaps, where large lateral accelerations/decelerations are introduced due to the bending and rebound of the ordnance in the lateral direction.

Figure 7:
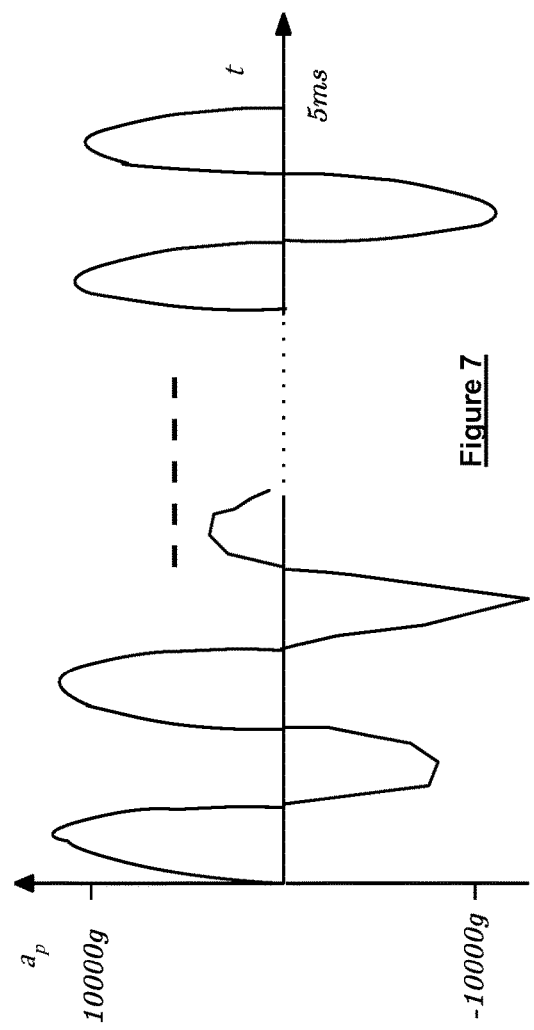
FIG. 7 illustrates an acceleration vs. time plot for short duration acceleration and deceleration pulses over relatively long durations.

Such embodiment of shock and shock/tail-slap testing machines can apply sequences of short duration acceleration and deceleration pulses, such as with peaks of around ±10,000 g over relatively long durations, such as over 5 msec, shown in the acceleration vs. time plot of FIG. 7. A simple calculation will the show that to achieve a peak acceleration of $a_p=\pm 10,000$ g, for a range of test article mass m of 10 lbs. to 250 lbs. (assuming zero mass for the test platform and its other required moving parts), the required peak force $F_p$ is as given in the Table 1 below.

TABLE 1

Peak force to achieve ±10,000 g acceleration/deceleration.

| | Test Article Weight (lbs.) | | |
|---|---|---|---|
| | 10 | 100 | 250 |
| Peak force (lbf) | 97,800 | 978,000 | 2,445,500 |

As can be seen, the required peak force levels are seen to be large but very short in duration, indicating that the best method of providing the desired short duration and high peak acceleration/deceleration shock loading is by impact loading. It is noted that a common method of applying acceleration/deceleration cycles to a test article when the peak acceleration levels and the mass of the test article are relatively low is by constructing a mass-spring type of vibrating system and exciting the system in resonance. However, to use a vibrating system to achieve ±10,000 g peak acceleration/deceleration levels would require a very stiff spring (structurally flexible) structure, even for the test articles of 10 lbs. in weight, which for a vibration cycle period of even around 0.1 msec, means that the vibrating system has to vibrate at 10,000 Hz. Such a vibratory system for direct excitation at resonance is obviously impractical.

Thus, a system that could provide short duration (of the order of 0.1 msec cycle period) and high peak acceleration/deceleration (of the order of ±10,000 g) shock loading is based herein on high frequency impact type loading.

In addition, as is shown below, the very high impact peak and low duration acceleration/deceleration pulses can be generated at relatively slow velocities of an impacting mass if the impact is with a massive, grounded (fixed), high strength and dense mass (barrier), and if the impacting surfaces are properly shaped to minimize elastic deformation and eliminate local plastic deformation.

Figure 8:
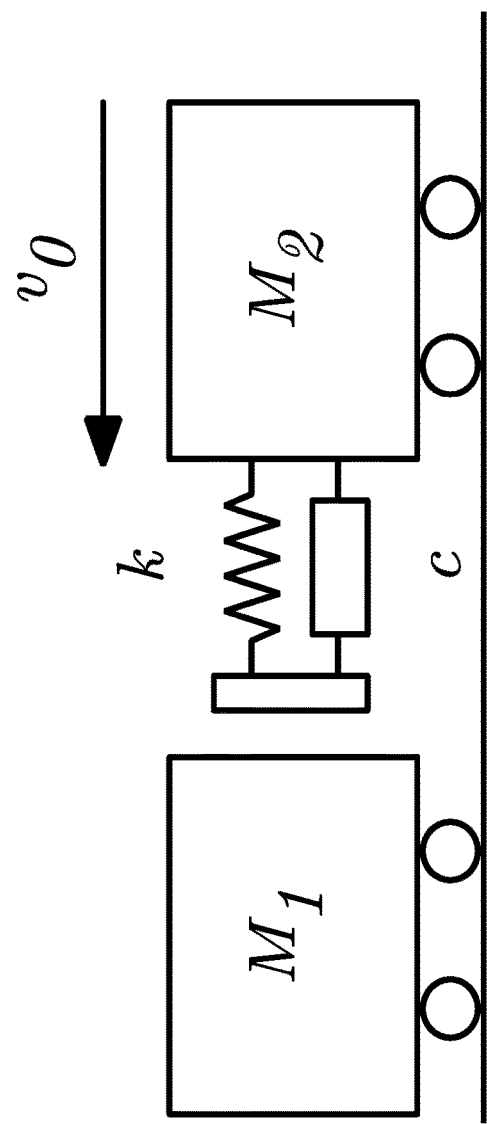
FIG. 8 illustrates a schematic model of two masses impacting each other.

Consider the two relatively rigid objects $M_1$, $M_2$ shown in FIG. 8. Consider the case in which the mass $M_2$ traveling at the velocity $v_0$ impacts the larger stationary $M_1$ (to which the test article is rigidly attached and its mass having been included in the indicated mass $M_1$). The spring rate k and damper c are considered to represent the linear approximation of the local deformation during the process of impact between the two objects $M_1$ and $M_2$. The values of the spring and damping rates k and c are dependent on the material characteristics and overall mass and geometry and structural construction of the two objects, and the geometry of their impacting surfaces. In this simple model, the damping element c is considered to provide the means to account for a generally nonlinear process of mechanical energy loss during impact, which for relatively stiff steel structures has been indicated as resulting in a coefficient of restitution of around 0.5-0.8.

Using a simple dynamic impact model with the coefficient of restitution of 0.7, the initial velocity $v_0$ that the mass $M_2$ requires to impart an acceleration pulse with a peak of 10,000 g on the mass $M_1$ for a desired duration can then be estimated. For example, for a given mass $M_1=15$ lbs., to generate an impact acceleration with a peak of $a_p=10,000$ g and impact pulse durations of 0.05 and 0.1 msec, two possible combinations of mass $M_2$ and its initial velocity $v_0$ are provided in the Table 2 below. It is noted that since impact duration is dependent on the material characteristics and geometry of the impacting objects and the contact surface geometries, the possible impact durations of 0.05 and 0.1 msec, which were obtained using Finite Element software for typical solid objects made out of steel, are being used in Table 2 below.

TABLE 2

| Impact Duration t (msec) | 0.05 | 0.1 |
|---|---|---|
| $M_2$ (lbs) | 1 | 2 |
| $v_0$ (m/s) | 33 | 35 |

If the mass $M_1$ is considered to be 150 lbs. or 375 lbs., to generate a similar acceleration pulse profile with a peak of $a_p=10,000$ g with the indicated impact pulse durations, a number of possible combinations of mass $M_2$ and its initial velocity $v_0$ are provided in the Tables 3 and 4 below. It is noted that the above $M_2$ mass levels of 15 lbs., 150 lbs. and 375 lbs. are considered to represent the mass of the object being tested plus the mass of the testing platform on which the test object is mounted.

TABLE 3

| | Impact Duration t (msec) | | | | | |
|---|---|---|---|---|---|---|
| | 0.05 | | 0.1 | | 0.2 | |
| $M_2$ (lbs) | 1 | 10 | 2 | 20 | 4 | 40 |
| $v_0$ (m/s) | 311 | 33 | 313 | 35 | 317 | 39 |

As can be seen in Tables 2-4, and considering that a mass $M_2$ speed of around 35-60 m/s (equivalent to 126-216 Km/hr) or slightly higher is achievable, particularly for smaller mass $M_2$, in general for longer durations impacts and larger impacting masses $M_2$ the desired $a_p=10,000$ g should be possible to achieve. However, since impacting mass $M_2$ speeds of around 300 m/s (or around 1,100 Km/hr) requires gun firing of projectiles, in which case the impact coefficient of restitution, even by proper selection of materials and geometries for both mass elements, will be closer to 1, thereby requiring multiple such shots around 1 msec apart, which is not an easy task to achieve. In addition, the testing process will no longer be relatively low cost and the testing system can no longer be considered to be reusable.

TABLE 4

| Impact Duration t (ms) | 0.2 | | 0.3 | |
|---|---|---|---|---|
| $M_2$ (lbs) | 8 | 80 | 16 | 160 |
| $v_0$ (m/s) | 394 | 47 | 302 | 41 |

In the above example, one may also consider both mass $M_1$ and mass $M_2$ to be moving with certain velocity towards each other, thereby making it possible to achieve higher relative impact velocities and thereby higher peak impact accelerations.

As can be seen from the above examples, impact between relatively stiff bodies can generate short duration and high peak acceleration pulses to test objects mounted on the impacted object. Such types of shock testing machines in which one or more mass elements are used to impact the test platform at high speeds in one or multiple directions, however have the following, mostly practical, shortcomings:

1. It is very difficult, if not impossible, to achieve multiple impacts spaced at very short times apart (of the order of 1 msec);
2. Since each impact also causes the test platform to be displaced, it makes it very difficult to provide multi-axial impacts that are spaced very short times apart;
3. As can be seen in Tables 2-4, to achieve the desired high peak acceleration levels, one would need to either use a relatively large impact mass or smaller mass with very high impact speed.

Figure 9:
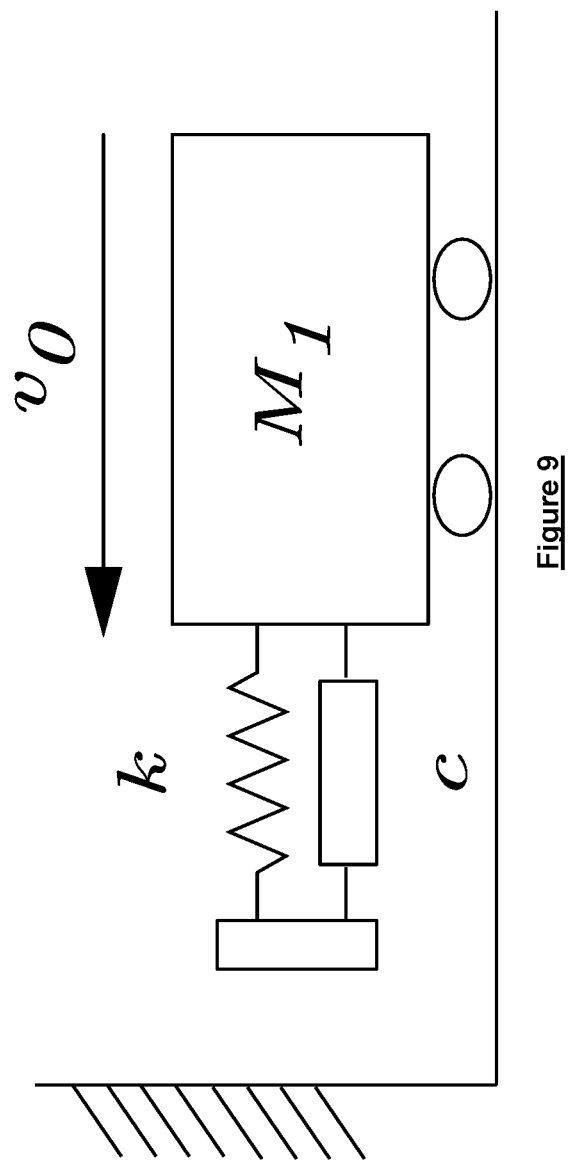
FIG. 9 illustrates a schematic model of a mass impacting a rigid fixed barrier.

Consider the case in which a rigid mass $M_1$ moving at a velocity $v_0$ impact a rigid fixed barrier (wall) as shown in FIG. 9. In FIG. 9, the spring rate k and damper c are considered to similarly represent the linear approximation of the local deformation during the process of impact between the mass $M_1$ and the fixed barrier. In this simple model, the damping element c is considered to provide the means to account for generally nonlinear process of mechanical energy loss during impact, which for relatively stiff steel structures has been shown to result in a coefficient of restitution of around 0.5-0.8.

As an example, consider a steel cube of 0.2 m per side weighing 62 Kg (140 lbs) impacting a relatively large grounded steel slab on one side at a velocity of 5 m/sec. If the impact coefficient is considered to be 0.7, a finite element model and analysis of the impact cycle (done using finite element software) indicates an impact duration of about 0.12 msec and by fitting the resulting deceleration/acceleration curve profile with a half sine curve, a peak deceleration of $a_p=10,222$ g is found to be generated.

A second embodiment of shock testing machine provides multi-axial short duration acceleration/deceleration pulses with very high peaks to relatively heavy objects (here by object it is meant the test object as mounted on a test platform). Such a machine generates the short duration and high peak acceleration/deceleration pulses by the impact of the test platform (to which the test object is attached) with a large and rigid grounded mass, thereby as was shown above, can achieve the highest possible short duration impact generated acceleration/deceleration peaks. Such a machine allows multi-axis impact generated pulses that are sub-milliseconds apart for very long time durations (such as well over 10-20 msec). The total motion of the impacting mass (test platform with attached test object) in each multi-axial impact direction is very small (e.g., a total of 4 mm in the example below with a total test platform and test object mass of 150 lbs.). As a result, all sensor data collection and powering wire harnesses can be used to directly connect onboard instrumentations to the data collection instrumentation equipment being used. As a result, there is no limitation on the amount of data that can be collected during each testing and onboard recording devices are not required. As discussed below, such a machine is provided with flywheels that function as sources of a large amount of mechanical energy that would allow it to sustain short duration and high peak acceleration/deceleration pulses over relatively long periods of time.

Figure 10:
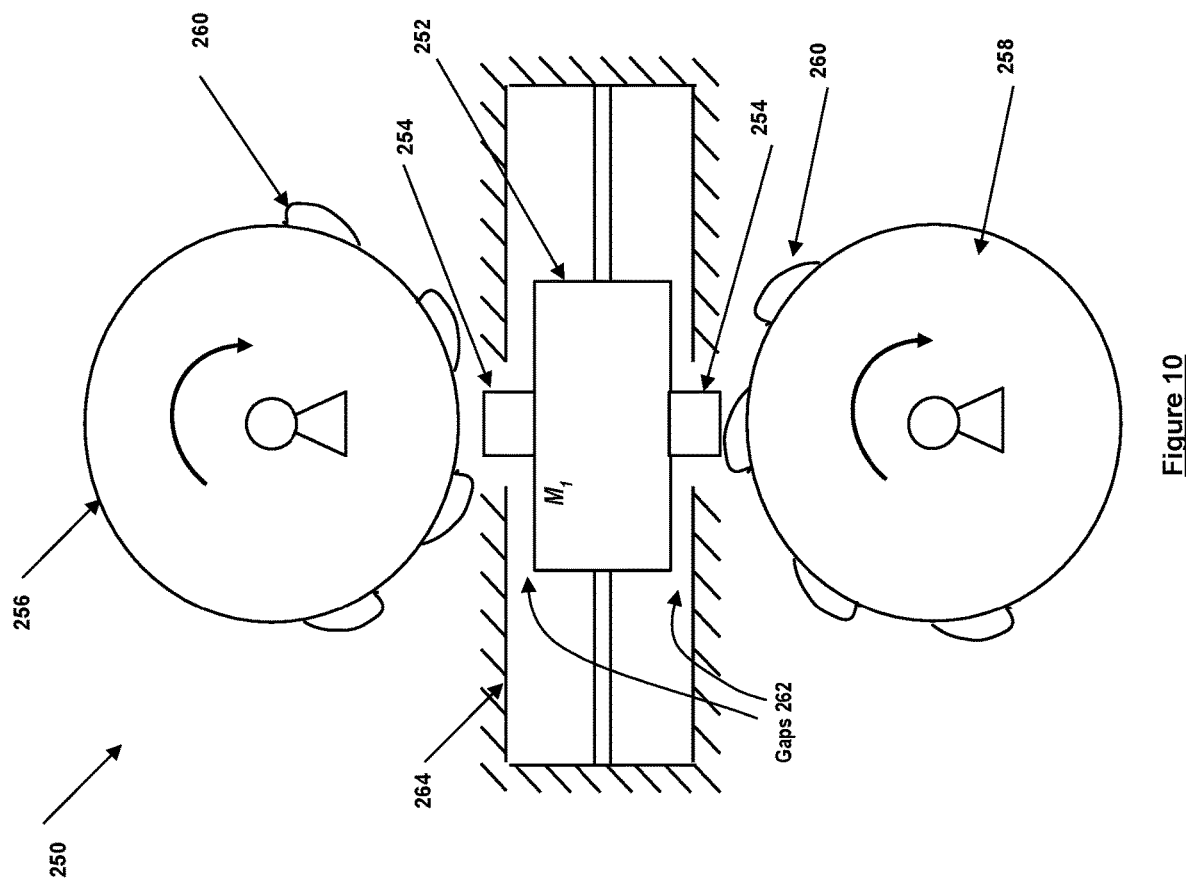
FIG. 10 illustrates a perspective view of a second embodiment of a shock testing machine.

A second embodiment of shock testing machine for multi-axial short duration and high peak acceleration/deceleration shock/tail-slap loading is shown in FIG. 10 and generally referred to by reference numeral 250. In this illustration and for the sake of simplicity, a single axis version of the machine is shown with a multi-axial design discussed below. The test platform 251 and test object attached thereto (not shown) are considered to have a mass $M_1$. The mass $M_1$ is attached to the grounded machine structure via a relatively flexible structure (beams, not shown in FIG. 10, can be replaced by a centrally and relatively flexible column 256 in the alternative version of FIG. 11 to allow the mass $M_1$ to impact in two perpendicular directions by a second set of flywheels and impact stops). The main function of the flexible structure in this machine is to ensure that the mass $M_1$ stays in its illustrated plane of motion and is not provided for the purpose of a centering/returning force, i.e., in fact it functions as a zero friction planar bearing rather than a spring element.

Two flywheels 256, 258 with equally spaced cams 260 are provided which would engage side engagement surfaces 254 on each side of the mass $M_1$ element. Although only four cams 260 are shown on the flywheels 256, 258 are shown in FIG. 10, the same is only shown for simplicity and the cams 260 are equally spaced about the entire circumference of the flywheels 256, 258. The cams 260 on each flywheel 256, 258 are synchronized to alternatively displace the mass $M_1$ towards the other flywheel by appropriate motors and controls (not shown). Very small gaps 262 are provided between the mass $M_1$ and the stops 264 (shown as ground in FIG. 10) of the relatively massive and grounded structure of the machine. The rotational speed of the flywheels 256, 258, the cam 260 profiles and their positioning relative to the side engagement surfaces of the mass $M_1$ are designed to accelerate the mass $M_1$ away from the engaging flywheel to a prescribed impact speed. The mass $M_1$ will then impact stops 264 provided on the surfaces of the machine structure, thereby imparting a very short duration but high peak acceleration/deceleration pulse to the mass $M_1$. Following each impact, the flywheel cam adds energy to the mass $M_1$ by accelerating it in its direction of travel following an impact to bring it close to the aforementioned prescribed impact velocity for its impact to the stops provided on the opposite side of the machine structure. As a result, almost as many of the short duration and high acceleration/deceleration impact pulses as desired may be produced with the flywheels supplying mechanical energy to the mass $M_1$ to compensate for the mechanical energy that is lost during each impact event. It is noted that the machine would still operate successfully even if the impact of the mass $M_1$ is not fully synchronized with the motion of the flywheels and that the flywheel cams do not engage the mass $M_1$ just after an impact as will be described below by studying different impact and flywheel positioning scenarios.

By way of example, the test platform 252 and test object attached thereto total mass can be $M_1=150$ lbs (68 Kg) and the gaps 262 between the mass 252 and the impacting stops 264 can be 2 mm. With a predicted coefficient of restitution of 0.6, the required mass $M_1$ velocity for impacting the stops on the massive grounded structure of the machine to achieve a peak acceleration/deceleration pulse of 10,000 g is about 5 m/sec and the impact pulse duration is found from finite element software simulation to be about 0.08 msec. The return velocity of the mass $M_1$ after each impact is calculated to be around 3 m/sec. The engaging flywheel cam 260 is therefore required to accelerate the mass $M_1$ from 3 m/sec to 5 m/sec during its around 4 mm travel back to the opposite machine structure stops 264. The process is then repeated by the engagement of a cam 260 from the opposite flywheel 256, 258. The process may be continued for almost any desired duration.

Figure 11:
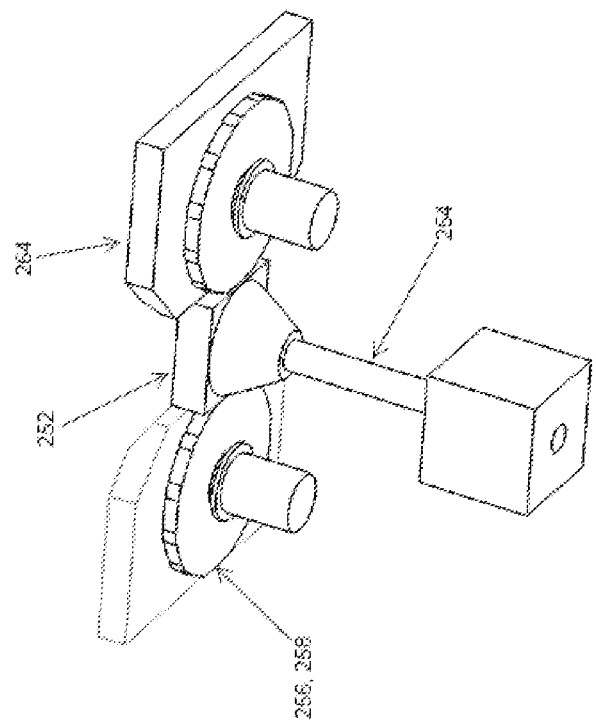
FIG. 11 illustrates a perspective view of a variation of the second embodiment shock testing machine of FIG. 10 having a central flexible element and only showing one of the flywheels.

In the above example, the generated 0.08 msec acceleration/deceleration pulses with 10,000 g peak occur every 1 msec and may be generated by a 20 inch diameter flywheel rotating at around 1,500 rpm with each cam spanning around 10 degrees of the flywheel periphery with a similar spanning gaps between the cams. In the partial view of FIG. 11 (shown without one of the flywheels and without a machine base or flywheel motor), the mass $M_1$ is shown to be mounted on a relatively flexible column 254 that minimally resists its planar bending (e.g., +/−2 mm) in any direction. In FIG. 11, to clearly show the basic components of the machine, only one flywheel 256 for generating the indicated impact pulses is shown. In the actual design, a similar flywheel 258 is provided to generate similar short duration and high peak impact acceleration/deceleration pulses in an opposite perpendicular direction, to provide the means of achieving multi-axial short duration and high peak impact acceleration/deceleration pulses.

Figure 12:
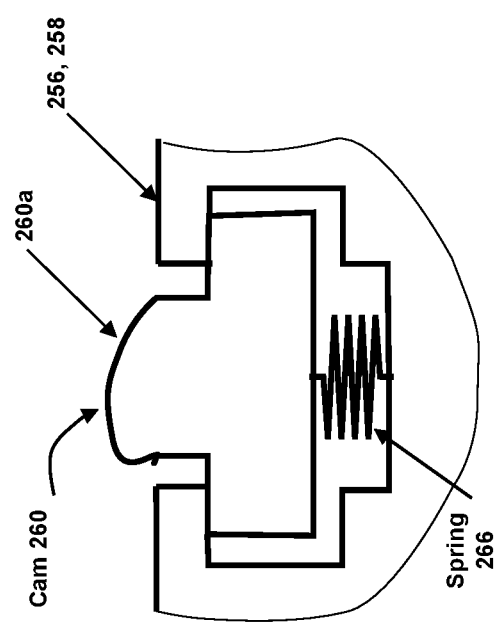
FIG. 12 illustrates an alternative cam configuration for the flywheels of the second embodiment shock testing machine of FIG. 10.

In the example provided above, it is noted that the flywheel cams are intended to accelerate the mass $M_1$ from its post impact velocity of 3 m/sec to a velocity of 5 m/sec for its next 10,000 g impact. The cam actuated acceleration can begin right after each impact in the indicated distance of 4 mm and during 1 msec. Under these circumstances, the cam is readily calculated to require to accelerate the mass $M_1$ at a rate of around 200 g, which indicates that the cam must apply a force of around 136,000 N (31,000 lbs) to the mass $M_1$. Considering the worst possible impact and cam positioning in which a cam is in the maximum extension towards the mass $M_1$ at which the mass has just impacted the stops on the opposite wall, then the mass $M_1$ would impact the cam surface with a velocity of 3 m/sec, which would generate an impact peak force of significantly greater than the above 31,000 lbs. However, such high impact shock loading events between the mass $M_1$ and the flywheel cams can be averted by limiting the compressive loading that the mass $M_1$ can apply to a cam 260. This may, for example, be accomplished as shown in FIG. 12 by providing preloaded compressive springs 266 to limit the force that can be applied to the cam 260 by the mass $M_1$. The springs 266 (such as Bellville washers) can be preloaded (e.g., in the example provided above, to around the aforementioned 31,000 lbs) and would begin to deform, i.e., retract the cam surface 260*a* away from the mass $M_1$, as the contact force level tends to go beyond the preloading force. In the example provided above, the maximum retracting distance that must be provided for the cam 260 is 4 mm, along which the preloaded springs can be designed to exhibit minimal force increase.

It is also noted that the impact force limiting cam design shown in FIG. 12 can also provide the means of starting the multi-axial short duration and high peak impact shock/tail slap loading by limiting initial impact load levels between the cams 260 and the mass $M_1$. Several options also exist for rapid initiation of the multi-axial impact induced shock loadings. For example, pairs of flywheels may be geared together and via a clutching system engage to a third larger flywheel for rapid acceleration to the required rpm. Other options include the use of hydraulic pistons to rapidly move the system flywheels the required 4 mm forward towards the mass $M_1$. Alternatively, the base of the preloaded spring elements of the cams may be retracted back to allow the cams to move back 4 mm, thereby not engage the mass $M_1$, and then be rapidly pushed forward to engage the cams with the contacting surfaces of the mass $M_1$.

Furthermore, although the shock testing machine 250 of FIG. 10 utilizes a pair of flywheels, those skilled in the art will appreciate that a single flywheel may also be utilized.

Although the novel shock testing machines and methods as covered herein is born from the specific needs of munitions, a technology that can reliably provide a very smooth shock, which is highly repeatable and lasts a relatively long amount of time has numerous commercial applications, particularly at a relatively inexpensive cost, including aircraft and satellite components, consumer electronic components, such as circuit boards and device casings, and automobile, light and heavy truck components.

In the embodiments of FIGS. 1-6 and those described in the prior art of U.S. Pat. No. 9,970,844, titled: "Mechanical high-G shock testing machines," the entire contents of which incorporated by reference, the test platform (e.g., 104 in the embodiment of FIGS. 1 and 3) to which the objects being tested are attached are decelerated by the application of braking forces from an initial velocity to a stop at a prescribed rate corresponding to the desired shock level and duration.

In the embodiments of FIGS. 1-6 and those disclosed in the U.S. Pat. No. 9,970,844, two basic methods are used for applying the decelerating braking forces to the test platform.

In a first method, the braking pads are fixed to the test platform (for example as a pair of brakes 126 attached to the provided web under the test platform (104 as seen in FIG. 3) and would then engage the sides of the adjustable brake engagement pathway 120, to generate the prescribed braking forces to decelerate the testing platform. The adjustable brake engagement pathway side(s) is provided with preloaded compression springs, which are adjusted to provide the desired compressive pressure between the brake pads and the sidewalls of the adjustable brake engagement pathway 120, thereby the desired decelerating friction forces.

In a second method, the brake pads are attached to the test platform via a mechanism that allows it to be kept away from the brake engagement surfaces, which are fixed to the machine structure. The mechanism is provided with preloaded springs, which are biased to provide to press the brake pads against the brake engagement surface to achieve the desired test platform decelerating forces. A machine structure fixed element is provided to engage the mechanism and release the springs to cause brake engagement once the test platform has reached the desired velocity. An example of a system using this method is shown in FIG. 11 of the aforementioned U.S. Pat. No. 9,970,844.

In the shock loading machines using the first brake engagement method, the frontal surfaces of the brake pads come into a relatively sudden contact with the surfaces of the brake engagement pathway, thereby the surfaces to begin the wear and eventually conform to the shape of the beveled portion 128 of the surfaces of the adjustable brake engagement pathway 120, FIG. 3. Then as the wear progresses, it causes the conformally worn surfaces to initially impact the surfaces of the beveled portion 128, thereby causing the testing platform to be subjected to an increasingly larger initial deceleration pulse, which would slowly grow larger than the preset shock loading level after each testing run. This means that to avoid subjecting the testing platform to such an initial deceleration pulse, the brake pads needs to be replaced often after several shock loading tests, depending on the level of wear resistance of the brake pad material. It will be appreciated that brake pad replacement takes time and after each replacement the brake engagement pathway 120, FIG. 3, needs to be adjusted to provide the desired shock loading level. It is, therefore, highly desirable to provide a brake engagement mechanism that does not require frequent brake pad change and the related shock loading level adjustment for a prescribed shock loading level.

In the shock loading machines using the second brake engagement method, the brake pads are attached to the test platform via a mechanism that keeps the brake pads a short distance away from the braking surfaces. The mechanism is then provided with preloaded springs that are biased to close the gap between the brake pads and the braking surfaces (see for example, FIG. 6 of the aforementioned prior art U.S. Pat. No. 9,970,844). Then as the test platform reached the desired velocity, the preloaded springs are released using a certain grounded cable or actuating lever or the like, thereby causing the brake pads to engage the provided braking surfaces (the machine rail for the example of FIG. 6 of the aforementioned prior art U.S. Pat. No. 9,970,844), thereby applying the prescribed friction forces to the test platform to decelerate it at the prescribed rate and duration. The method obviously works but can be significantly improved to allow the total moving mass, i.e., the mass of the test platform and the braking mechanism, to be significantly reduced, thereby making the shock loading machines to achieve higher deceleration rates or test larger payloads for the same deceleration rates.

The main features of the above second method that leads to relatively heavy total weight of the test platform and the braking mechanism that is being carried by the test platform are as follows. To achieve high deceleration rates, the braking forces are very high, for example, for a modest 3000 G deceleration rate of a 2-3 Kg payload, several tens of tons may have to be applied to the braking pads. As a result, the preloaded springs must be preloaded to significantly higher force levels to accommodate for the inevitable flexibility of the braking mechanism and the testing platform and allow for the brake pad travel to close the gap to the braking surfaces and the elasticity of the pads. As a result, the test platform needs to be made heavier to withstand the high spring preload levels and to be stiff enough to minimize deformation due to the applied spring preloads. In addition, the spring preloading and release mechanisms need to be heavier for the same reasons. It is then appreciated that for a given braking force level, the level of deceleration rate that can be achieved is proportionally reduced.

In addition, the shock loading machines designed using the above two basic methods, such as the embodiments of FIGS. 1-6 or the aforementioned U.S. Pat. No. 9,970,844, require a significant amount of time to disengage the released brakes after each test and set the machine up for the next test. The process of adjusting the brake pressure and thereby the deceleration rate of the test platform is also not very user friendly and require a relatively long time.

In addition, the shock loading machines designed using the above first method, such as the embodiments of FIGS. 1-6, result in rapid wear of the frontal regions (where they initially engage the braking surface areas) of the braking pads as was previously described, which causes the introduction of an increasingly higher initial sharp high but short duration deceleration pulse to the test platform. As a result, the brake pads must be replaced often and well before a noticeable wear of the entire brake pad surfaces. This would significantly increase the cost of maintenance and service and machine down time. In addition, relatively fast brake pad wear also causes a change in the shock loading profile which would require frequent brake mechanism adjustment to achieve high testing repeatability.

A need therefore exists for methods and devices for shock loading machines that can perform tests as described for the embodiments of FIGS. 1-6, i.e., to apply (decelerating) shock loadings of prescribed magnitude and duration to objects being tested, which do not suffer from the aforementioned shortcomings of shock loading machines designed used the above described two basic methods.

Therefore, a need exists for methods to design shock loading machines with significantly lighter test platform and braking mechanism mass, therefore making them capable of applying significantly higher shock loading deceleration levels and requiring significantly lower braking forces to achieve the higher shock loading deceleration levels.

Therefore, a need also exists for methods to design shock loading machines in which the machine can be readied quickly for the next shock loading test after a test has been performed so that the time for testing each test, therefore the cost of performing tests is significantly reduced. It will be appreciated by those skilled in the art that in many applications, hundreds or even thousands of shock loading tests have to be performed on certain components and the capability of readying the machine for the next test in a few minutes as compared to tens of minutes is highly desirable and results in a considerable cost saving. This goal requires that brake mechanisms require minimal effort to be disengaged and that the braking mechanism do not need resetting after each test with the same prescribed shock loading deceleration profile.

Therefore, a need also exists for methods to design shock loading machine braking mechanisms such that the pressure acting on the brake pads stays relatively uniform at all times, therefore yielding an essentially uniform brake surface wear, thereby significantly increasing the number of shock loading tests after which the brake pads need to be replaced. Such uniform pressure and wear characteristic would also reduce the rate at which the braking pressure needs to be adjusted and keeps the shock loading profile essentially unchanged for a large number of tests before requiring a slight adjustment.

Accordingly, the following novel methods and devices are disclosed that addresses the above needs.

Figure 13:
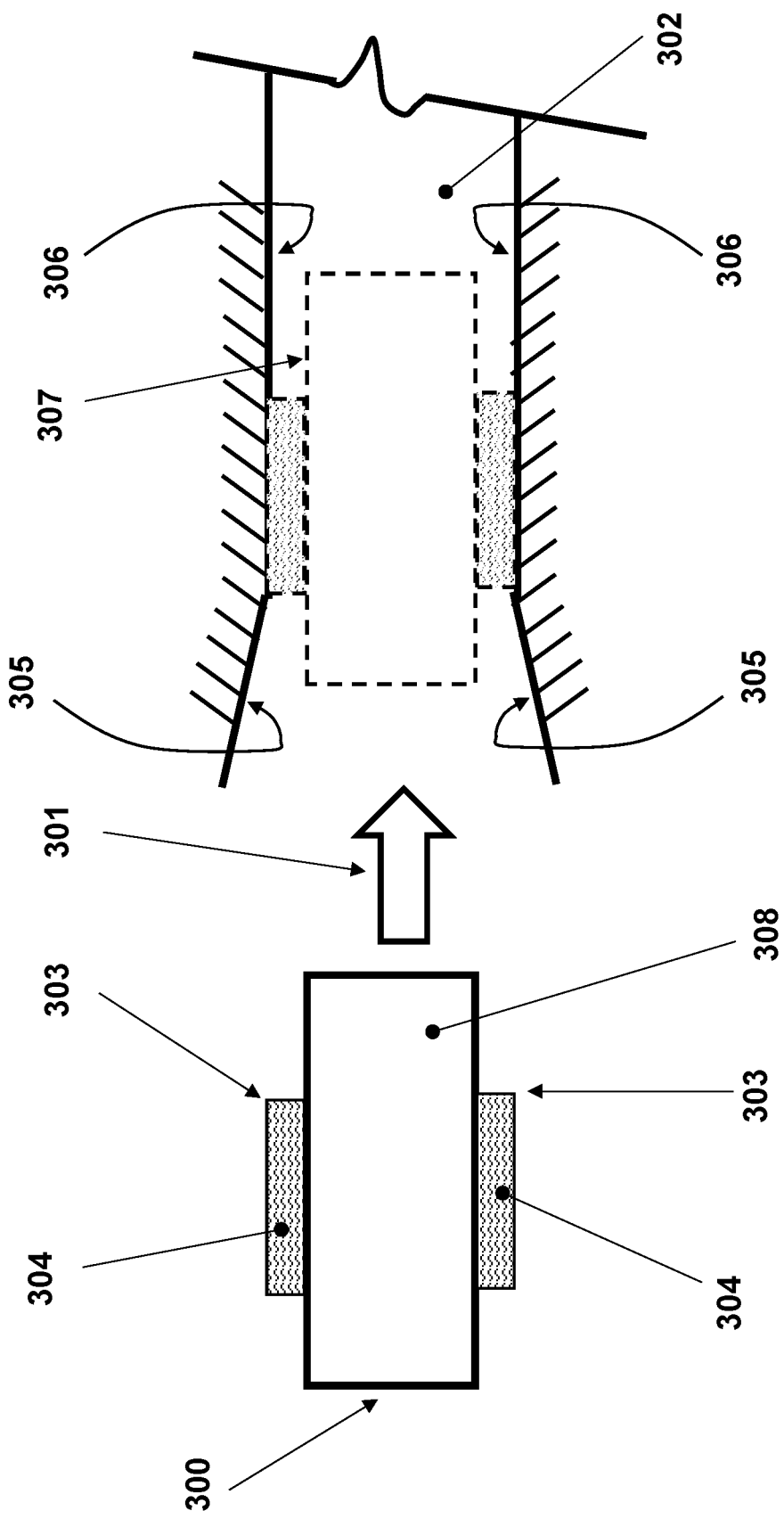
FIG. 13 illustrates a method of designing braking mechanisms for the embodiments of FIGS. 1-6 and their operation.

As was previously described, braking mechanisms for the embodiments of FIGS. 1-6 is schematically shown in FIG. 13. In the schematic of FIG. 13 the test platform assembly 300 is shown moving in the direction of the arrow 301 towards the brake engagement pathway 302 (118 in FIG. 2). Similar to the embodiment of FIG. 2, the braking gap (the distance between its brake pad engaging surfaces) of the brake engagement pathway 302 is adjustable (the adjustment mechanism is not shown for clarity) to achieve a desired braking force and thereby a prescribed test platform deceleration rate. The test platform is also considered to be traveling over a guiding rail (not shown) as, for example, the rails 108 as shown in FIG. 2, or any other guiding rails or other means known in the art. The test platform 300 is initially accelerated as was described for the embodiments of FIGS. 1-6 or through free drops or using any other method known in the art to achieve the prescribed velocity and to achieve the desired shock loading duration before entering the brake engagement pathway 302.

Then as the test platform 300 enters the brake engagement pathway 302, the tips 303 of the brake pads 304 would first come into contact with the slopes surfaces 305 of the brake engagement pathway 302, causing the resisting braking force to begin to be applied to the test platform 300, and rise to preset level as the entire brake pads 304 come into contact with the contact surfaces 306 of the brake engagement pathway 302. In the schematic of FIG. 13, the test platform is shown with dashed lines in this fully engaged braking state.

Figure 14:
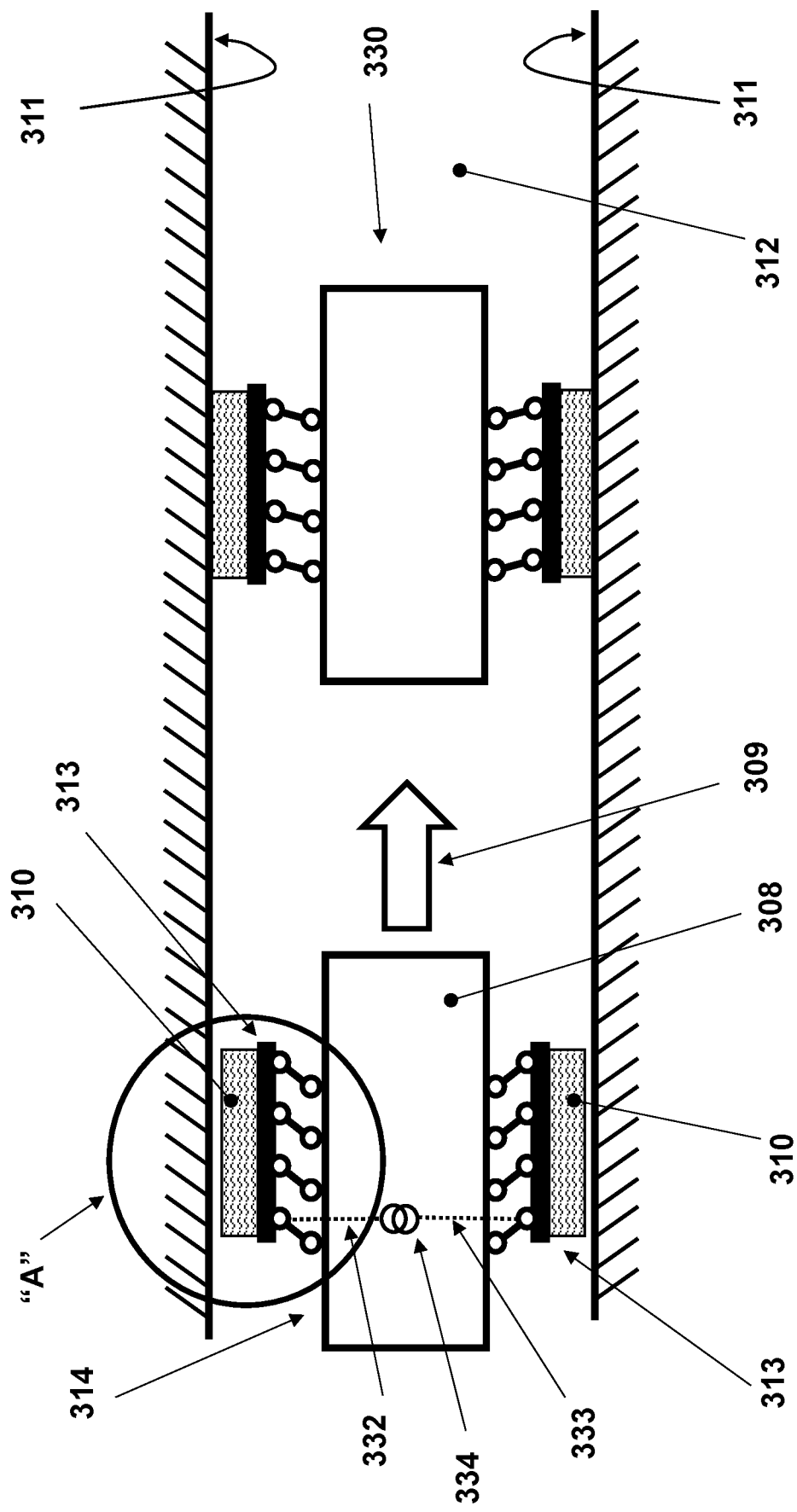
FIG. 14 illustrates a braking mechanism based on the disclosed third method and their method of operation.

Apparatus and methods used to brake mechanisms for shock loading machines that addresses the aforementioned shock loading machine needs and their operation is described using the schematic of FIG. 14. In the schematic of FIG. 14, a design of the braking mechanisms and their operation are described. The remaining components of the shock loading machine using the disclosed braking mechanism may be as described in the embodiments of FIGS. 1-6 or those disclosed in U.S. Pat. No. 9,970,844 or other shock loading machine designs known in the art.

In the schematic of FIG. 14 the test platform body 308 is shown to be initially moving in the direction of the arrow 309 while its brake pads 310 are retracted. The brake pads are held in their retracted configuration a short distance from the side walls 311 of the brake engagement pathways 312 by a brake release and adjustment mechanism 313, the schematic of which is shown in the blow-up view "A" in FIG. 15, the details of which and its operation is described below. The test platform body 308 is also considered to be traveling over a guiding rail (not shown) as, for example, the rails 108 as shown in the FIG. 2, or any other guiding rails or ways known in the art.

The test platform body 308 is initially accelerated as was described for the embodiments of FIGS. 1-6 or through free drops or using any other method known in the art to reach a prescribed velocity to achieve the desired shock loading duration before entering the brake engagement pathway 312.

Figure 15:
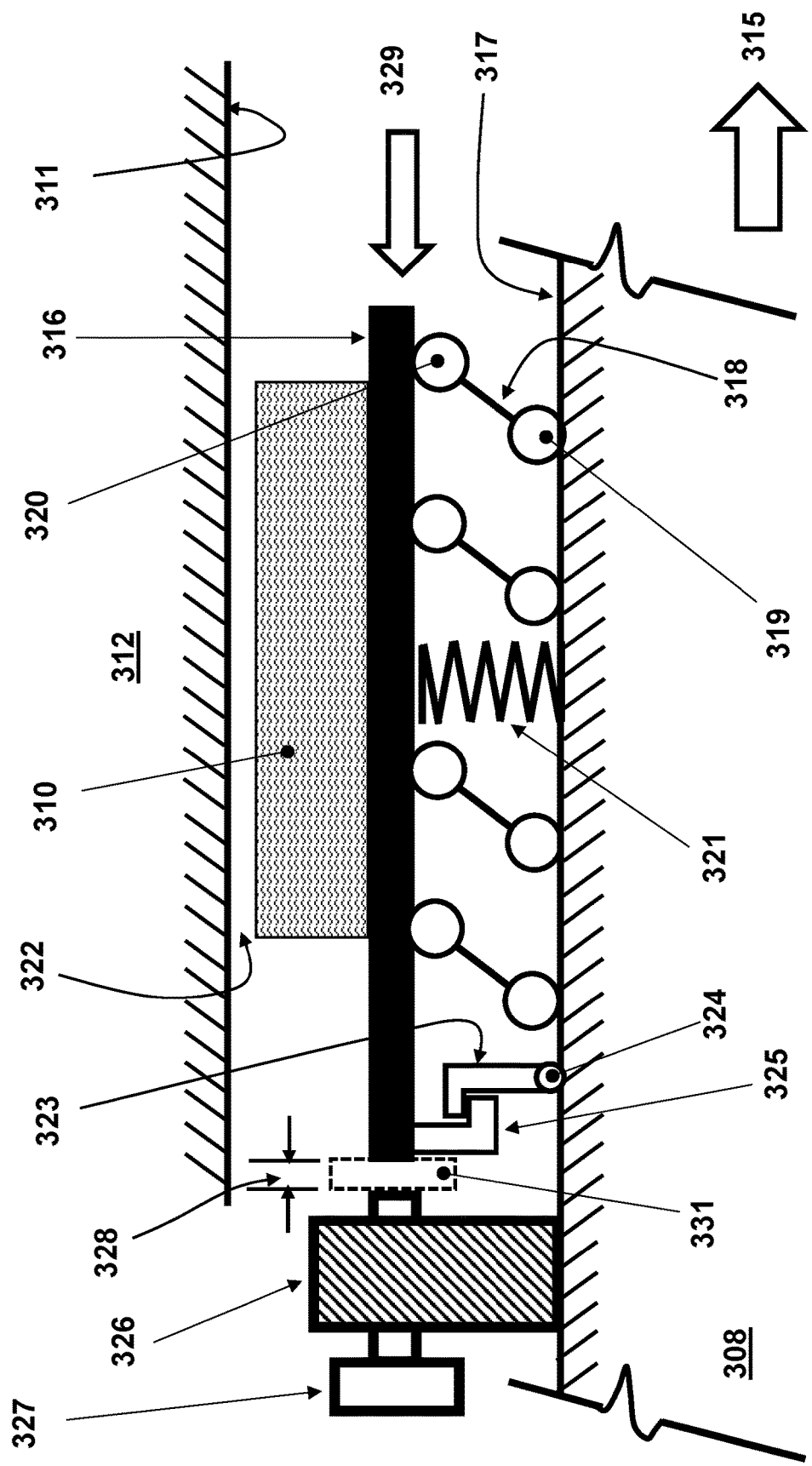
FIG. 15 illustrates the brake adjustment and release mechanism of the embodiment of FIG. 14 as indicated by the blow-up view "A" in FIG. 14.

The schematic of the brake release and adjustment mechanism 313 (blow-up view "A" in FIG. 14) is shown in FIG. 15. In FIG. 15, the brake release and adjustment mechanism 313 is shown in the configuration 314 (FIG. 14) of the test platform, i.e., in its retracted state. In the blow-up view of FIG. 15, only a portion of the braking mechanism attachment side of the test platform body 308 is shown. In the schematics of FIGS. 14 and 15, the brake pads 310 are shown to be constructed in one piece. However, it will be appreciated by those skilled in the art that the brake pads may be constructed by a plurality of brake pad segments for manufacturing and replacement ease and cost concerns. In addition, since the shock testing machines use the braking mechanism just a few milliseconds at most once every 5-10 milliseconds, therefore heat dissipation is usually not of much concern.

As can be seen in the blow-up view of FIG. 15, the brake pads 310 are provided with a relatively rigid backing plate 316 to provide stiffness to ensure a more uniform pressure distribution over the braking pads once they are deployed. The backing plate is attached to a side 317 of the test platform body 308 by a parallelogram type mechanism consisting of the at least two links 318, which are connected to the side 317 of the test platform body by rotary joints 319 and to the relatively rigid backing plate 316 by rotary joints 320. The rotary joints 319 and 320 can be wide enough to at least cover a significant portion of the width (perpendicular to the plane of the FIG. 15) of the relatively rigid backing plate 316 to ensure movements of the backing plate 316 and thereby the braking pads 310 parallel to the surface side surface 317 of the test platform body 308 and the side walls 311 of the brake engagement pathways 312, FIG. 14.

The brake release and adjustment mechanism 313 is also provided with a preloaded compressive spring 321, which is biased to move the relatively rigid backing plate 316 and thereby the braking pads 310 away from the test platform body 308 and towards the side walls 311 of the brake engagement pathways 312 to close that gap 322 and engage the brake pads 310 with the brake engagement pathway. In the (retracted) configuration of the brake release and adjustment mechanism 313 shown in FIG. 15, the braking pads 310 are kept in their retracted position by a readily releasable mechanism, such as the one shown in FIG. 15. Here, the relatively rigid backing plate 316 is provided with an "L" shaped member 325. An engaging "L" shaped member 323, which is attached to the side 317 of the test platform body 108 by a rotary joint 324 is also provided. Then by engaging the two "L" shaped members 324 and 325 as shown in FIG. 15, the braking pads 310 are kept in their retracted configuration seen in FIG. 15.

In the schematic of FIG. 15, the test platform 308 is shown to be moving in the direction of the arrow 315. Similar to the previous embodiments, the test platform 308 is accelerated to the desired velocity to achieve the prescribed shock loading level duration. Then when the desired velocity is reached, the "L" shaped member 323 is rotated clockwise as viewed in the schematic of FIG. 15, disengaging the "L" shaped member 325, thereby releasing the relatively rigid backing plate 316 and the braking pads 310. The compressively preloaded biasing spring 321 would then bring the braking pads into contact with the side walls 311 of the brake engagement pathways 312, FIG. 14, and cause the braking pads to apply a starting pressure on to the surface of the walls 311. It will be appreciated by those skilled in the art that once the relatively rigid backing plate 316 is released, the biasing compressively preloaded springs applies a force to the plate 316, forcing the plate to move in the direction of the arrow 329 relative to the test platform 308 as the parallelogram links 318 rotate in the counter-clockwise direction as viewed in the plane of FIG. 15. Exemplary methods for actuating the "L" shaped member 323 and related device designs are described below.

It will be appreciated by those skilled in the art that the brake mechanisms 313 on both sides of the test platform 308 are released essentially simultaneously. Then, once the brake mechanisms 313 are released, the brake pads 310 move to close the gaps 322 with the side walls 311 of the brake engagement pathways 312 and begin to apply pressure to the surfaces proportional to the forces provided by the biasing compressive springs 321. The resulting friction forces between the brake pads 310 and the surfaces the side walls 311 of the brake engagement pathways 312 would then begin to tend to further rotate the links 318 in the counter-clockwise direction as viewed in the plane of FIG. 15, thereby further increasing the friction forces, which tend to decelerate the test platform 308. By ensuring that at this configuration the angle between the links 318 and the side 317 of the test platform 308 is close to 90 degrees, e.g., 5-10 degrees, then the friction forces increase rapidly, while the designed flexibility of the test platform body in the direction of the applied normal force by the brake pads 310 to the surfaces the side walls 311 of the brake engagement pathways 312 and inevitable flexibility of the links 318, joints 319, backing plates 316, brake pads 308, and the structure of the side wall 311 would require further counter-clockwise rotation of the links 318 to achieve a desired level of friction forces to act on the test platform, i.e., to achieve the desired level of test platform 308 deceleration. This configuration 330 of the test platform and the deployed braking mechanisms is also shown in FIG. 14.

It will be appreciated by those skilled in the art that the guides provided on the test platform (not shown) for travel along the brake engagement pathways 312 (such as the sleeve type guide shown in the test platform 104 in FIG. 3 traveling over the rails 108 in FIGS. 2 and 3) can be provided with a small enough clearance to allow for a slight lateral displacement of the test platform 308, FIG. 14, to allow the forces applied to the braking pads 310 on both sides of the test platform 308 to become essentially equal, thereby minimizing the generation of any moment in the direction normal to the plane of the FIG. 14. For this reason, it is also important that the center of mass of the test platform 308 and the objects being tested to be as close to the center of the test platform as possible.

It will be appreciated by those skilled in the art that once the retracted braking mechanism is released, the parallelogram mechanism(s) constructed by the equal length and parallel links 318 and hinged by rotary joints 319 and 320 to the parallel surfaces (links) of the test platform 308 side and the side walls 311 of the brake engagement pathways 312, respectively, would force the braking pads 310 to translate to close the gap 322 without undergoing any rotation. As a result, the entire surface of the braking pads would essentially contact the surface of the side walls 311 of the brake engagement pathways 312 simultaneously and the surface pressure between the braking pads and the side walls 311 would also essentially remains uniform. As a result, the braking pads 308 would wear uniformly, thereby increasing the life of the braking pads and minimizing the amount of time that is required to maintain the shock loading machine and adjust the braking mechanism to achieve repeatable and consistent test results. This characteristic of the present embodiment of shock loading machine would also reduce the machine down time and the cost of its operation.

It will be appreciated by those skilled in the art that by setting the angle between the links 318 and the side 317 of the test platform 308 close to 90 degrees, e.g., 5-10 degrees, the relatively stiff structure of the test platform 308 and the side walls and the related machine structure can be designed to ensure that a small rotation counter-clockwise rotation of the links 318 would result in the generation of a relatively large brake pad 310 pressure on the side walls 311 and thereby relatively large braking forces and shock loading deceleration. It is also appreciated by those skilled in the art that the angle between the links 318 and the side 317 of the test platform 308 should be prevented from getting too close to 90 degrees, i.e., its kinematically singular positioning, beyond which the braking force would rapidly drop.

The brake mechanisms 313 is also provided with a friction force level adjustment mechanism consisting of a member 326, FIG. 15, which is attached to the test platform structure 308. The member 326 is then provided with an adjustment screw 327 that is used to adjust the gap 328, that is the maximum range of travel of the braking pad backing plates 316, i.e., the maximum pressure that the braking pads 310 can exert on the side walls 311 of the brake engagement pathways 312, i.e., the friction force that is generated by the braking pads 310, i.e., the peak deceleration level that is applied to the test platform 308, and thereby to the object attached to the test platform for shock loading testing.

It is appreciated that the braking mechanism 313 may be kept in its retracted configuration shown in FIG. 15 using various methods and mechanisms, only one of which was described above, using the engaging "L" shaped members 323 and 325. One other method would be to place a spacer member 331 (shown with dashed lines in FIG. 15) to fill the gap 328 between the adjustment screw 327 and the braking pad backing plates 316 to keep the braking mechanism in its retracted configuration. Then, by pulling the spacer member 331 out of the engagement between the adjustment screw 327 and the braking pad backing plates 316, backing plate 316 is freed to move in the direction of the arrow 329 relative to the test platform 308, thereby engaging the braking mechanism as was previously described to decelerate the testing platform at the prescribed level and duration. Another method of keeping the braking mechanisms in their retracted states is by connecting the two braking pad backing plates 316 of the test platform 308 together via releasable links or cables 332 and 333 as shown in the schematic of FIG. 14 and keeping them connected by passing a pin or the like (not shown) through holes or rings 334 provided at their free ends. The braking mechanisms are then released by the pulling of the connecting pin, as will be described below.

Once a shock loading test is completed, i.e., when the deployed braking system has decelerated the test platform 308 to a stop, the baking mechanism is in a "locked" state and the test platform 308 needs to be released to be able to be moved to position for the next test. As can be seen in the schematic of FIG. 15 and the deployed configuration of the braking mechanism configuration 330 of FIG. 14, as the braking mechanism is released, the braking pad backing plates 316 is quickly moved in the direction of the arrow 329, closing the gap 328 and brought to a stop against the adjustment screw 327. Once the test platform has been decelerated to a stop, the (normal) forces acting on the braking pads 310 are due to the lateral flexibility of the test platform structure and the braking mechanism elements, the biasing compressive spring 321, and the structure of the brake engagement pathway 302. These structural flexibility related forces are those that keep the test platform and its braking mechanisms in a "locked" position. As can be seen in the schematic of FIG. 15, a small displacement of the body of the test platform 308 would result in a clockwise rotation of the links 318, thereby relieving all the above structural flexibility related forces except for the biasing force of the springs 321. This displacement can be readily made by pushing the braking pad backing plates 316 away from the member 326, for example by advancing the adjustment screw 327. However, since the adjustment screw 327 needs to be reset back to its previous adjusted position, a separate screw (not shown but essentially parallel to the adjustment screw) can be provided on the member 326, which is then advanced enough to release the test platform and open up the gap 328 enough to re-engage the "L" shaped members 323 and 324 or to reinsert the spacer member 331 or re-deploy other mechanisms that are provided to hold the braking mechanisms in their retracted configuration, and then are retracted. The test platform is thereby readied for the next shock loading test. It is therefore appreciated that after each shock loading test, the present embodiment provides a braking system that can be quickly readied for the next test following a few simple steps.

In general, the biasing force of the springs 321 is relatively small since they are needed only for braking mechanism deployment and the test platform 308 can still be dragged with minimal force against the resulting friction forces of the braking pads 310 in the opposite direction of the arrow 315 and towards its starting positioning for the next test. However, since the braking mechanisms must be locked in their retracted positions for the next shock loading test, the aforementioned added screw to the member 326 can be used to release the brakes as was described and lock the brake mechanisms in their retracted position and then freely move the test platform 308 to its starting position for a new test without causing any brake pad 310 and side surface 311 wear.

It will be appreciated by those skilled in the art that for the total moving mass of the test platform 308 and the payload, i.e., test objects, the level of friction forces that have been set and generated by the braking pads 310 determine the level of shock loading deceleration, and the initial velocity of the test platform 307 as the prescribed shock loading deceleration level is reached determines the duration of applied deceleration rate at the prescribed level. Therefore to achieve shock loading duration precision, it is essential that the retracted braking mechanism is released when the test platform has reached the required velocity.

As it is previously mentioned, the retracted braking mechanisms 313, FIGS. 14 and 15, may be released using several methods. For example, the pin holding the rings 334 together, FIG. 14, and the spacer member 331, FIG. 15, may be pulled out and the side of the engaging "L" shaped member 323 may be pulled to the right as viewed in FIG. 15 to rotate it in the clockwise direction to release the braking mechanism by pulling of a cord as was, for example, described for the embodiments of FIGS. 5-9 of the prior art U.S. Pat. No. 9,970,844. In the present embodiments, the cord will be attached on one end to the pin holding the rings 334 together, or to the spacer member 331, or the side of the engaging "L" shaped member 323 and fixed to the structure of the machine on the other end. Alternatively, the machine structure fixed end may be made to ride behind or below the test platform (not shown) and would be caught and pulled by a hook attached to the machine structure.

Alternatively, the retracted braking mechanisms 313, FIGS. 14 and 15, may be released using a sensory and actuation system onboard the test platform 308, which would continuously measure the velocity of the test platform as it is being accelerated in the direction of the arrow 309, FIG. 14, and when a prescribed velocity is reached, it would release the retracted braking mechanisms.

The velocity of the test plat platform 308 may be determined onboard the test platform using an accelerometer by integrating the test platform acceleration over time by an onboard processor. Alternatively, the velocity of the test platform 308 may be measured by a linear encoder, line markings of which are attached along the path of travel of the test platform, for example to the side wall 311, FIG. 14, or over the surface of the brake engagement pathway 302, with the optical counter of the optical encoder being attached to the traveling test platform. It will be appreciated by those skilled in the art that other methods for onboard measurement of the test platform speed are also available and may be used. An alternative method would be the use of an external sensory system, such as a laser or RF based velocity detector stationed at the end of the brake engagement pathway 302 or on the side of the pathway to measure the test platform speed and transmit the information via an RF of optical link to a receiver onboard the test platform.

Figure 16:
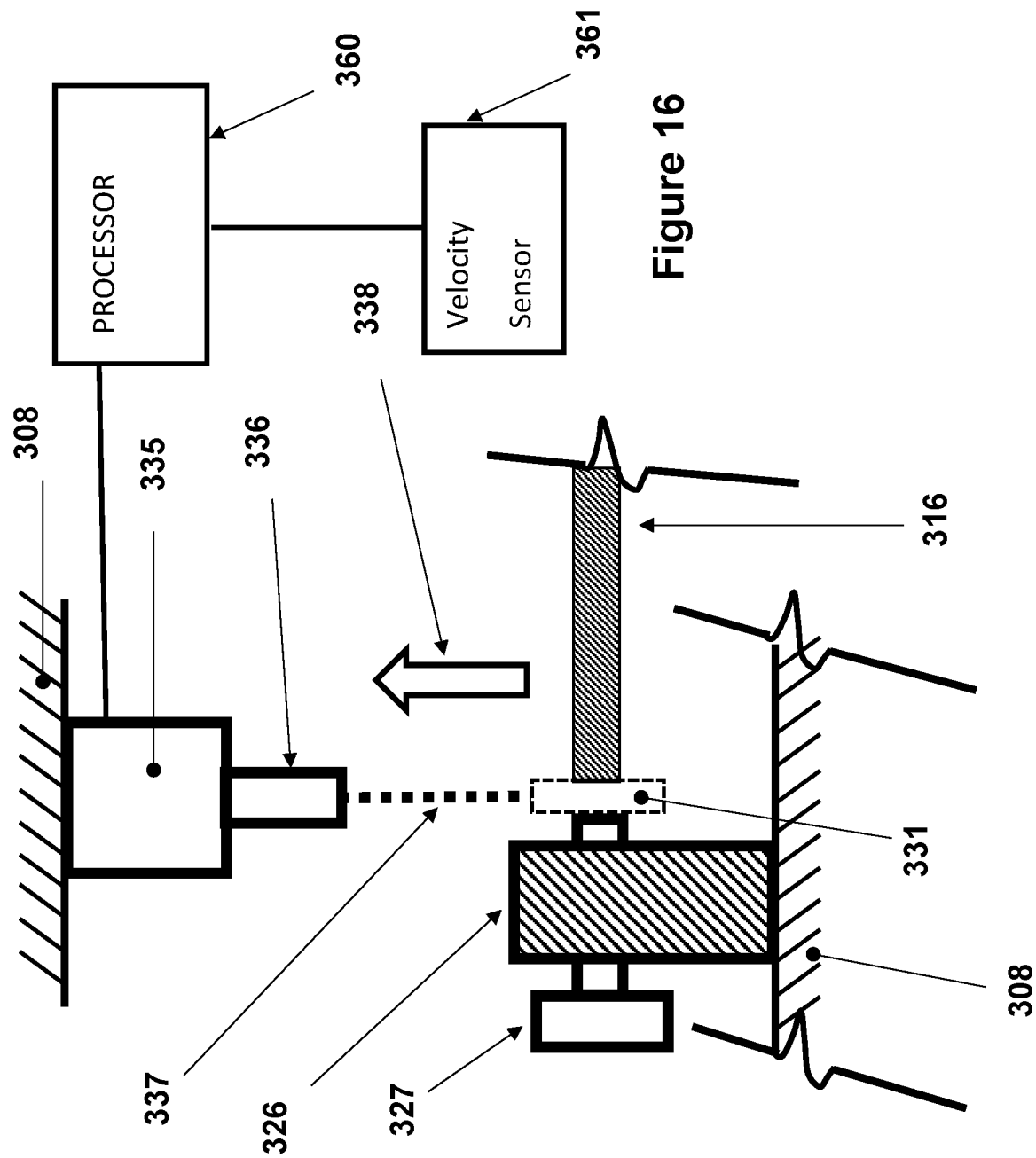
FIG. 16 illustrates a solenoid operated brake release mechanism for the embodiment of FIGS. 13-15.

It will be appreciated that in the embodiments in which the retracted braking mechanisms 313, FIGS. 14 and 15, is to be released by a command from an onboard test platform velocity measuring sensor, the brake release mechanism actuation system must also be onboard the test platform. It will be appreciated by those skilled in the art that various mechanisms and actuation devices may be use for this purpose. As an example, as shown in the schematic of FIG. 16, a solenoid 335 that is attached to the test platform 308 and powered by an onboard battery or capacitor may be used to pull a cord 337 in the direction of the arrow 338. In FIG. 16, the member 337 (such as a cord) is shown to be attached to the translating core 336 of the solenoid 335 on one end and to the spacer member 331, FIGS. 15 and 16, on the other end. Then as the test platform 308, FIGS. 13-16, is accelerated to the prescribed velocity, the onboard processor 360, which is used to process the velocity sensor 361 and operate the solenoid 335, would energize the solenoid 335, thereby causing the translating core 336 to move in the direction of the arrow 338, pulling the cord 337 and thereby pulling the spacer member 331 out of engagement between the adjustment screw 327 and the braking pad backing plates 316 and releasing the retracted braking mechanism 313 as was previously described.

It will be appreciated by those skilled in the art that the solenoid 335 may also be similarly used to pull the cord 337 that is connected instead to the pin that is holding the rings 334 together, FIG. 14, to release the braking mechanism 313. The solenoid 335 may also be similarly used to actuate the engaging "L" shaped member 323, FIG. 15, by connecting the cord 337 to the member 323 such that by the pulling of the cord, the member 323 would be rotated in the clockwise direction to release the braking mechanism 313. Other release mechanisms may also be similarly actuated.

It will be appreciated by those skilled in the art that in applications such as in munitions firing and vehicular and other similar impact simulation shock loading tests, the speed of test platform at the time of brake mechanism release is very high, sometimes well over 70-80 miles per hour. For this reason, once the aforementioned test platform velocity sensor has determined that the prescribed velocity level has reached and sends a command to the solenoid 335 to release the braking mechanism, the time it takes for the solenoid to pull the cord with the required force to release the braking mechanism is desired to be as short as possible, which can be a fraction of a millisecond. However, the solenoid actuated mechanism of FIG. 16 for pulling the spacer member 331, or pulling the pin that is holding the rings 334 together, FIG. 14, or rotating the engaging "L" shaped member 323 by the pulling of the cord 337 may be too slow, i.e., might take over 20-30 milliseconds, thereby causing the test platform to travel a relatively long distance before the braking mechanism is released and the braking pads are fully engaged. In the meantime, the test platform velocity has most probably changed and the shock loading machine length in the direction of the test platform travel must be made unnecessarily long.

To achieve very fast braking mechanism release action, the solenoid 335 actuation is used instead to release a preloaded compressive or tension spring element, which would in turn actuate the release mechanism, such as the pulling of the spacer element 331, FIG. 16, or the pulling of the pin that is holding the rings 334 together, FIG. 14, or the rotation of the engaging "L" shaped member 323, FIG. 15. It will be appreciated by those skilled in the art that such a design has several advantages over the direct solenoid or other similar actuation device release mechanisms, such as allowing the use of a smaller solenoid releasing a tensile or compressive spring with a relatively high preload to achieve a very fast braking mechanism release.

Figure 17:
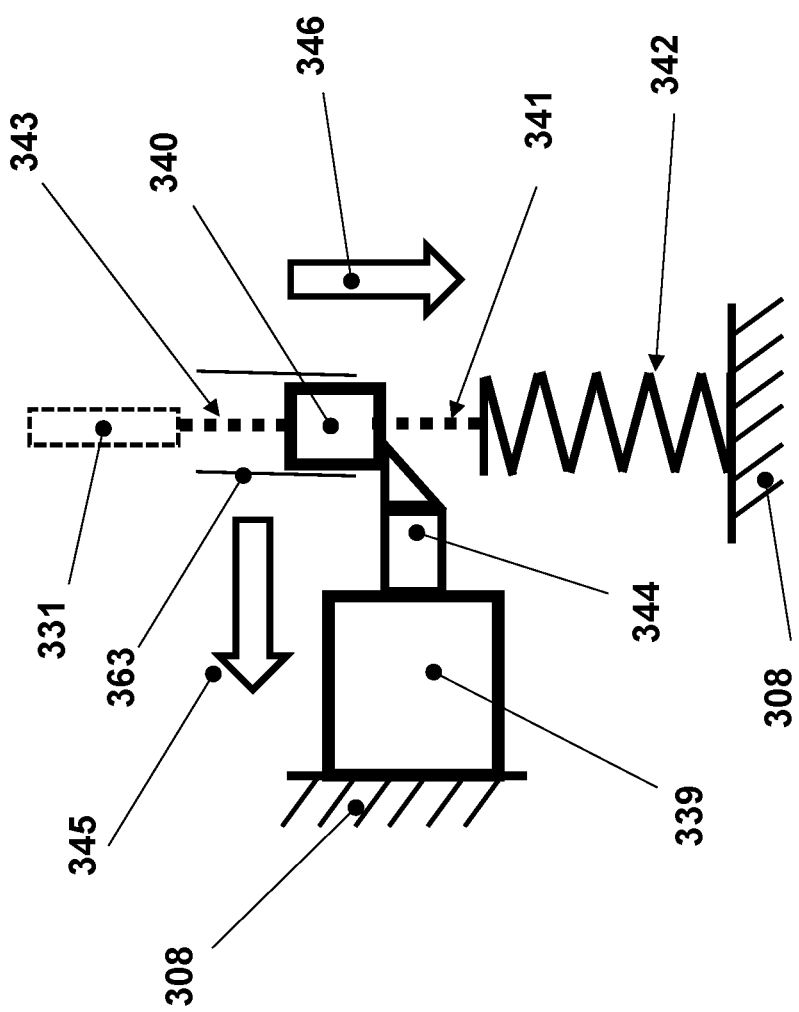
FIG. 17 illustrates an alternative solenoid operated brake release mechanism for the embodiment of FIGS. 13-15.

Such a preloaded spring assisted brake release mechanism may assume various configurations. An example of which for pulling the space element 331 is illustrated in FIG. 17. In this mechanism, the solenoid 339, which is attached to the test platform 308, is used to release a member 340, which is constrained in a guide 363 to up and down movement as viewed in the schematic of FIG. 17. The member 340 is connected on one side to a preloaded tensile spring 342, directly or via a cable 341, and to the spacer element 331, FIG. 15, on the other end, directly or via a cable 343, as shown in FIG. 17. Before brake mechanism release, the member 340 is held in the position shown in FIG. 17 over the tip of the translating core 344 of the solenoid 339. Then as the test platform 308, FIGS. 13-16, is accelerated to the prescribed velocity, the onboard processor 360, which is used to process the velocity sensor 361 and operate the solenoid 339, would energize the solenoid 339, thereby causing the translating core 344 to move in the direction of the arrow 345, thereby releasing the member 340. The preloaded tensile spring 342 would then pull the member 340 downward in the direction of the arrow 346, thereby causing the spacer member 331 to be pulled down by the connecting cord 343, thereby pulling the spacer member 331 out of engagement between the adjustment screw 327 and the braking pad backing plates 316, FIG. 15, and releasing the retracted braking mechanism 313 as was previously described. The pulling of the pin that is holding the rings 334 together, FIG. 14, or rotation of the engaging "L" shaped member 323, FIG. 15, may similarly be actuated by energizing the solenoid 339 to release the member 340.

It will be appreciated by those skilled in the art that in addition to achieving fast braking mechanism release action, the braking pads 304 of the braking mechanism must also be configured to fully engage the contact surfaces 306 of the brake engagement pathway 302, i.e., achieve the prescribed friction force level very rapidly once the braking mechanism 313 has been released. It will also be appreciated by those skilled in the art that in many shock loading tests, particularly those due to impacts and munitions firing, the duration of shock loading event is only a few milliseconds and sometimes even less than one millisecond. In addition, the initial time taken for the peak acceleration/deceleration levels to be reached during munitions firing and various impact events is usually a fraction of the full shock loading duration. It is, in such circumstances, very important that once the brake mechanism is released and the brake pads 310 begin to engage the side walls 311 of the brake engagement pathways 312, FIG. 15, the prescribed braking force and thereby the prescribed peak shock loading deceleration rate be reached very rapidly. To achieve this goal, the following characteristics of the various components of the test platform 308, braking mechanism 313 and the brake engagement pathways 312 can be properly configured.

To ensure that the prescribed braking force level, i.e., the prescribed shock loading deceleration rate, is reached very rapidly following the release of the braking mechanism, the system and components of the shock loading machine can have the following features. The moving links 318 and joints 319 and the braking pad backing plates 316 can be very stiff in the direction of applying braking force to the braking pads 310. The biasing spring(s) 321 can have a high level of preloading for fast braking mechanism actuation with low stiffness so that the biasing force does not significantly drop during the braking mechanism deployment. The braking pads 310 can also be stiff in compression, such as being relatively thin. In addition, the structure of the test platform 308 and the structure of the brake engagement pathways 312, FIG. 14, can also have high stiffness.

Figure 18:
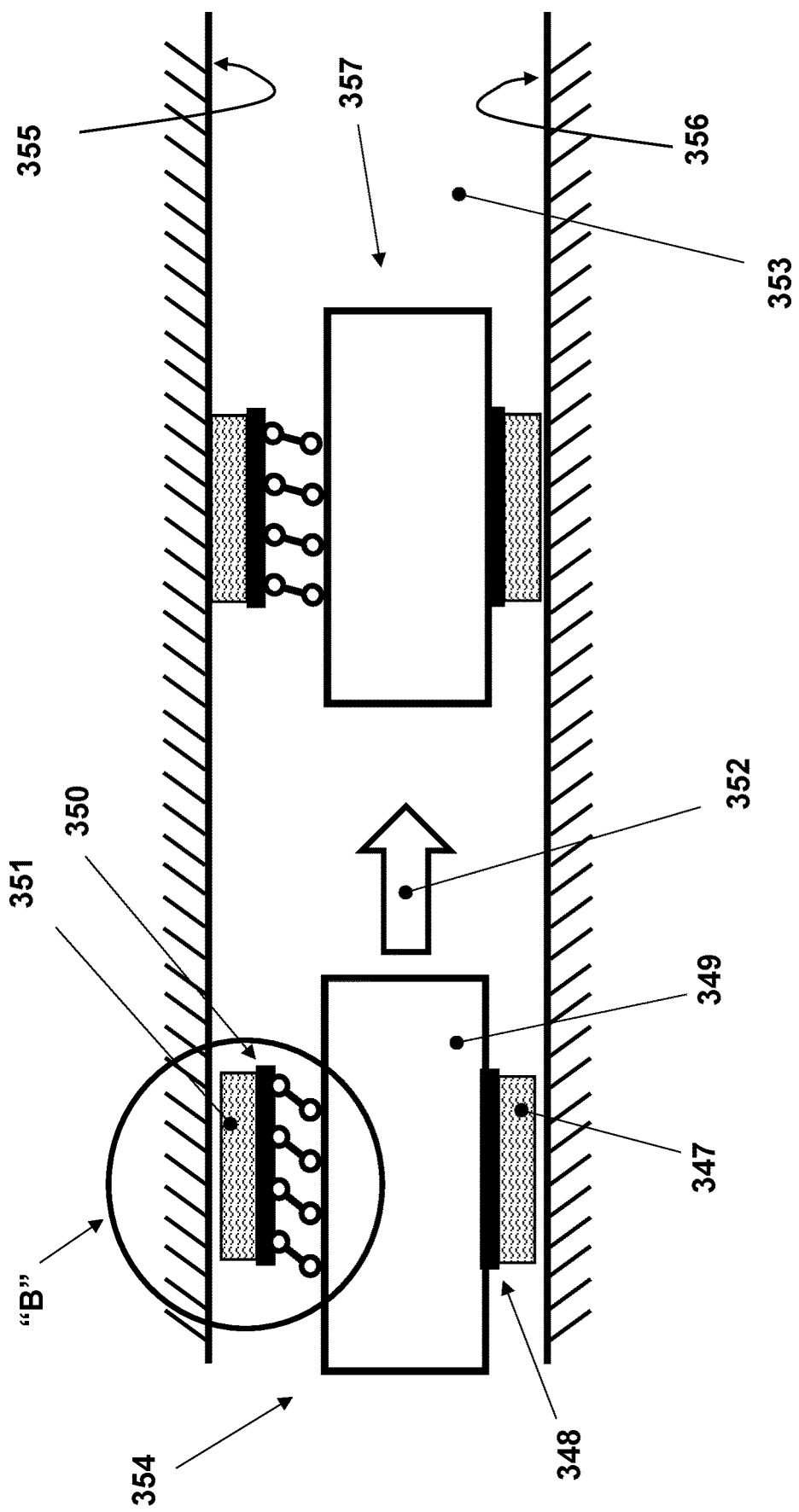
FIG. 18 illustrates an alternative embodiment of the design of the braking mechanisms for the embodiments of FIGS. 1-6 and their operation.

An alternative embodiment of the braking mechanism illustrated in the schematics of FIGS. 14-17 for the embodiments of FIGS. 1-6 is shown in FIG. 18. The embodiment of FIG. 17 is similar to the embodiment of FIGS. 14-17, except that one of the braking pads 347 is rigidly attached to the test platform 349, if needed via a relatively rigid backing plate 348 for ease of replacement and adjustment. The same braking mechanism 350 (313 in FIG. 14) is provided on the other side of the test platform 349. While the brake mechanism is retracted, the brake pad 347 is kept very close to wall 356 of the brake engagement pathway 353. Like the embodiment of FIG. 14, the test platform assembly 354 with the retracted braking mechanism 350 is shown to be moving in the direction of the arrow 352 in the brake engagement pathway 353. Like the embodiment of FIG. 14, the brake pad 351 is still held in their retracted configuration a short distance from the side walls 355 (311 in FIG. 14) of the brake engagement pathways 353 by the brake release and adjustment mechanism 350, the schematic of which is still shown in the blow-up view "B" in FIG. 15 (same as the blow-up view "A" in FIG. 14), the details of which and its operation was previously described. The test platform body 349 (308 in FIG. 14) is still considered to be traveling over a guiding rail (not shown) as, for example, the rails 108 as shown in the FIG. 2, or any other guiding rails or ways known in the art.

The test platform body 349 is still initially accelerated as was described for the embodiments of FIGS. 1-6 or through free drops or using any other method known in the art to the prescribed velocity to achieve the desired shock loading duration before entering the brake engagement pathway 353.

The brake release and adjustment mechanism 350 can be identical to 313 in FIG. 14 and operate as was described previously for its blow-up view "A" shown in FIG. 15 in its retracted configuration. In the schematic of FIG. 18, the test platform 349 is shown to be moving in the direction of the arrow 352. Like the previous embodiments, the test platform 349 is accelerated to the desired velocity to achieve the prescribed shock loading level duration. Then when the desired velocity is reached, the relatively rigid backing plate (316 in FIG. 15) is released as was previously described. The compressively preloaded biasing spring (321 in FIG. 15) would then bring the braking pads 351 into contact with the side wall 355 of the brake engagement pathways 353, FIG. 18, and cause the braking pads to apply a starting pressure on to the surface of the wall 355.

Then as the pressure builds up between the braking pad 351 and the wall 355 of the brake engagement pathways 353, a small clearance that is provided between the test platform 349 guides and the brake engagement pathways 353 rails (not shown in FIG. 18 but, for example, like the rails 108 shown in the FIG. 2) would cause the test platform 349 to move towards the side 356 of the brake engagement pathways 353, thereby engaging the brake pad 347 with the side wall 356. Then as the brake mechanism 350 is fully deployed, the braking pads 351 and 347 would be applying essentially equal braking force to the side walls 355 and 356, respectively, with the total braking force resulting in the prescribed deceleration rate of the test platform. It will be appreciated that the braking force can still be adjusted by the adjustment screw 327, FIG. 15, as was previously described. The test platform assembly 354 following the braking mechanism release is shown in the configuration 357, FIG. 18.

In the schematic of FIG. 18, the brake pads 347 and 351 are shown to be constructed in one piece. However, it will be appreciated by those skilled in the art that the brake pads may be constructed by a plurality of brake pad segments for manufacturing and replacement ease and cost concerns. In addition, since the shock testing machine uses the braking mechanism just a few milliseconds at most once every 5-10 milliseconds, therefore heat dissipation is usually not of much concern.

It will also be appreciated by those skilled in the art that for the shock loading machine embodiments of FIGS. 13-15 and FIG. 18, the machines can be provided with safety features in case the braking mechanism is not released due to a malfunctioning releasing mechanism or if the braking force adjustment is not set properly to stop the test platform 308 before reaching the end of the brake engagement pathways 312. This is particularly the case when the braking mechanism is released by a signal from a sensor measuring the velocity of the test platform to energize the brake mechanism releasing solenoid, FIGS. 16 and 17. In such embodiments, besides the possibility of component malfunction, with the provided test platform accelerating forces (generated by the bungee or any other method), the test platform may not reach its velocity threshold, thereby the braking mechanism may stay retracted. The required fail-safe mechanisms to be provided to stop such "runaway" test platforms can be based on providing stop bumpers (shock absorbers) at the end of the brake engagement pathway 312. In addition, in the embodiments in which a velocity sensor onboard the test platform initiates the brake mechanism release, a second release mechanism, such the ones described for the embodiment of FIG. 15, may also be provided downstream to where the braking mechanism is expected to be released, so that in case of malfunction or if the prescribed velocity threshold is not reached, the downstream mechanism would release the brake mechanism and thereby bring the test platform to a relatively smooth stop.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A brake for use with a shock testing machine, the brake comprising:
   a brake material for generating a frictional force to stop a test platform when the brake material is urged against an opposed braking surface;
   two or more links for rotatably connecting the brake material to the test platform;
   a biasing spring to bias the brake material towards the braking surface;
   a restraint mechanism for restraining the braking material, against a biasing force of the biasing spring, in a retracted position where the braking material is separated from the braking surface; and
   a release mechanism for releasing the restraint of the release mechanism to bias the brake material against the braking surface;
   wherein the two or more links are configured such that relative movement between the brake material and braking surface while the brake material and braking surface are engaged causes a frictional force between the brake material and braking material to increase.

2. The brake of claim 1, wherein the two or more links comprise a parallelogram linkage.

3. The brake of claim 2, wherein each of the two or more links comprising the parallelogram linkage is rotatable relative to the brake material and such rotation is limited to less than 90 degrees.

4. The brake of claim 3, further comprising a stop for limiting the rotation of each of the two or more links comprising the parallelogram linkage.

5. The brake of claim 4, wherein the stop is adjustable such that a maximum rotation of the parallelogram linkage relative to the brake material is variable.

6. A shock testing machine comprising:
   a test platform upon which one or more objects to be tested are mounted;
   one or more rails upon which the test platform is movable in a longitudinal direction; and
   a brake for stopping the test platform relative to the one or more rails, the brake comprising:
       a brake material for generating a frictional force to stop the test platform when the brake material is urged against an opposed braking surface;
       two or more links for rotatably connecting the brake material to the test platform;
       a biasing spring to bias the brake material towards the braking surface;
       a restraint mechanism for restraining the braking material, against a biasing force of the biasing spring, in a retracted position where the braking material is separated from the braking surface by a gap; and
       a release mechanism for releasing the restraint of the release mechanism at a prescribed time, position or velocity to bias the brake material against the braking surface;
       wherein the two or more links are configured such that relative movement between the brake material and braking surface while the brake material and braking surface are engaged causes a frictional force between the brake material and braking material to increase.

7. The shock testing machine of claim 6, further comprising a sensor for determining when to release the restrain of the release mechanism.

8. The shock testing machine of claim 6, wherein the two or more links comprise a parallelogram linkage.

9. The shock testing machine of claim 8, wherein each of the two or more links comprising the parallelogram linkage is rotatable relative to the brake material and such rotation is limited to less than 90 degrees.

10. The shock testing machine of claim 9, further comprising a stop for limiting the rotation of each of the two or more links comprising the parallelogram linkage.

11. The shock testing machine of claim 10, wherein the stop is adjustable such that a maximum rotation of the parallelogram linkage relative to the brake material is variable.

* * * * *